US009491446B2

(12) United States Patent
Inoue et al.

(10) Patent No.: US 9,491,446 B2
(45) Date of Patent: Nov. 8, 2016

(54) IMAGE PROCESSING DEVICE, IMAGE DISPLAY DEVICE, IMAGE PROCESSING METHOD, AND IMAGE PROCESSING PROGRAM

(75) Inventors: Yuji Inoue, Tokyo (JP); Hidetsugu Suginohara, Tokyo (JP); Satoshi Yamanaka, Tokyo (JP); Kazuhiro Ishiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 593 days.

(21) Appl. No.: 13/985,396

(22) PCT Filed: Jan. 31, 2012

(86) PCT No.: PCT/JP2012/052085
§ 371 (c)(1),
(2), (4) Date: Aug. 14, 2013

(87) PCT Pub. No.: WO2012/111422
PCT Pub. Date: Aug. 23, 2012

(65) Prior Publication Data
US 2013/0321598 A1 Dec. 5, 2013

(30) Foreign Application Priority Data
Feb. 15, 2011 (JP) ................. 2011-029836

(51) Int. Cl.
*H04N 13/04* (2006.01)
*G09G 3/20* (2006.01)
*G09G 3/36* (2006.01)

(52) U.S. Cl.
CPC ............ *H04N 13/0447* (2013.01); *G09G 3/20* (2013.01); *G09G 3/3611* (2013.01); *G09G 2320/028* (2013.01); *G09G 2320/0209* (2013.01); *G09G 2320/0252* (2013.01)

(58) Field of Classification Search
CPC .................................................. H04N 13/0447
See application file for complete search history.

(56) References Cited

U.S. PATENT DOCUMENTS

| 6,573,928 | B1 | 6/2003 | Jones et al. | |
|---|---|---|---|---|
| 8,471,921 | B1* | 6/2013 | Li | H04N 9/045 |
| | | | | 348/222.1 |
| 2005/0111100 | A1 | 5/2005 | Mather et al. | |
| 2006/0202945 | A1 | 9/2006 | Feng | |

(Continued)

FOREIGN PATENT DOCUMENTS

| CN | 1343068 A | 4/2002 |
|---|---|---|
| CN | 1678943 A | 10/2005 |
| CN | 1987628 A | 6/2007 |
| EP | 0953962 A2 | 11/1999 |
| GB | 2 405 516 A | 3/2005 |
| JP | 2616652 B2 | 6/1997 |
| JP | 2000-004455 A | 1/2000 |
| JP | 3167351 B2 | 5/2001 |

(Continued)

*Primary Examiner* — James Pontius
(74) *Attorney, Agent, or Firm* — Birch, Stewart, Kolasch & Birch, LLP

(57) ABSTRACT

An image processing device for receiving input image data in which multiple images displayed in mutually differing directions from a display are combined includes: a crosstalk correction processor for performing a crosstalk correction; and a response speed improvement correction processor for performing a response speed improvement correction. The crosstalk correction processor has an optical crosstalk correction processor for performing an optical crosstalk correction, and an electrical crosstalk correction processor for performing an electrical crosstalk correction. The optical crosstalk correction processor performs the correction based on the input image data and outputs optical crosstalk correction processed image data.

10 Claims, 23 Drawing Sheets

(56) References Cited

U.S. PATENT DOCUMENTS

| | | |
|---|---|---|
| 2007/0222724 A1 | 9/2007 | Ueno et al. |
| 2008/0079674 A1 | 4/2008 | Ooishi et al. |
| 2009/0079680 A1 | 3/2009 | Yagiura |
| 2010/0266201 A1* | 10/2010 | Cabral ................ H04N 5/3572 382/167 |
| 2011/0141130 A1* | 6/2011 | Yagiura ................ G09G 3/003 345/589 |
| 2011/0169821 A1 | 7/2011 | Ishiguchi |
| 2011/0221655 A1* | 9/2011 | Fukui .................... G09G 3/001 345/4 |
| 2011/0292089 A1 | 12/2011 | Nakahata et al. |
| 2012/0092520 A1* | 4/2012 | Proca ...................... H04N 9/69 348/223.1 |
| 2015/0264330 A1* | 9/2015 | Ogasahara ............ H04N 9/735 348/272 |

FOREIGN PATENT DOCUMENTS

| | | |
|---|---|---|
| JP | 2006-023710 A | 1/2006 |
| JP | 2006-251796 A | 9/2006 |
| JP | 2008-015123 A | 1/2008 |
| JP | 2008-268540 A | 11/2008 |
| JP | 2008-304563 A | 12/2008 |
| JP | 4367775 B2 | 11/2009 |
| JP | 4375468 B2 | 12/2009 |
| JP | 2010-160383 A | 7/2010 |
| JP | 4530267 B2 | 8/2010 |
| JP | 2011-040947 A | 2/2011 |
| JP | 2011-166744 A | 8/2011 |
| JP | 2011-254154 A | 12/2011 |
| WO | WO 2011/001738 A1 | 1/2011 |

* cited by examiner

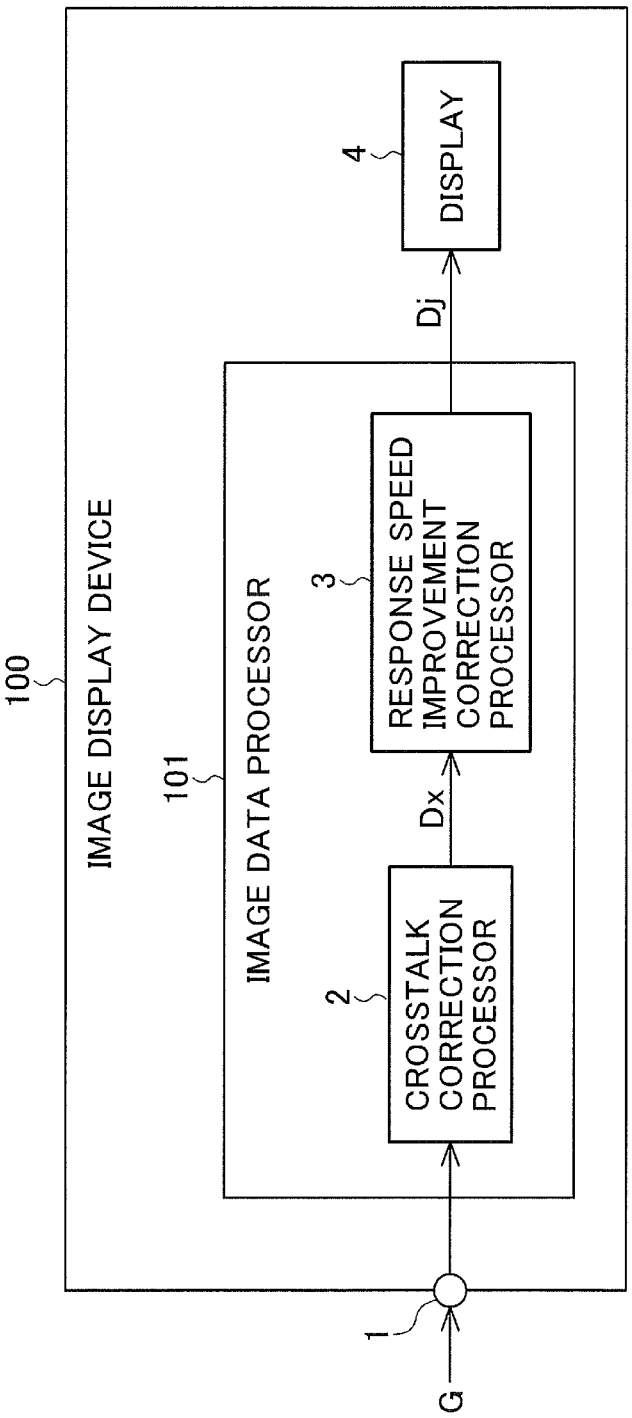

| | | GRADATION VALUE OF SUB-PIXEL HAVING CROSSTALK EFFECT | | | | | | |
|---|---|---|---|---|---|---|---|---|
| | | ... | 28 | 29 | 30 | 31 | 32 | ... |
| GRADATION VALUE OF SUB-PIXEL TO BE CORRECTED | ⋮ | ... | ⋮ | ⋮ | ⋮ | ⋮ | ⋮ | ... |
| | 38 | ... | −1 | −1 | −1 | −2 | −2 | ... |
| | 39 | ... | −1 | −1 | −2 | −2 | −2 | ... |
| | 40 | ... | −1 | −1 | −2 | −2 | −2 | ... |
| | 41 | ... | −2 | −2 | −2 | −2 | −2 | ... |
| | 42 | ... | −2 | −2 | −2 | −3 | −3 | ... |
| | ⋮ | ... | ⋮ | ⋮ | ⋮ | ⋮ | ⋮ | ... |

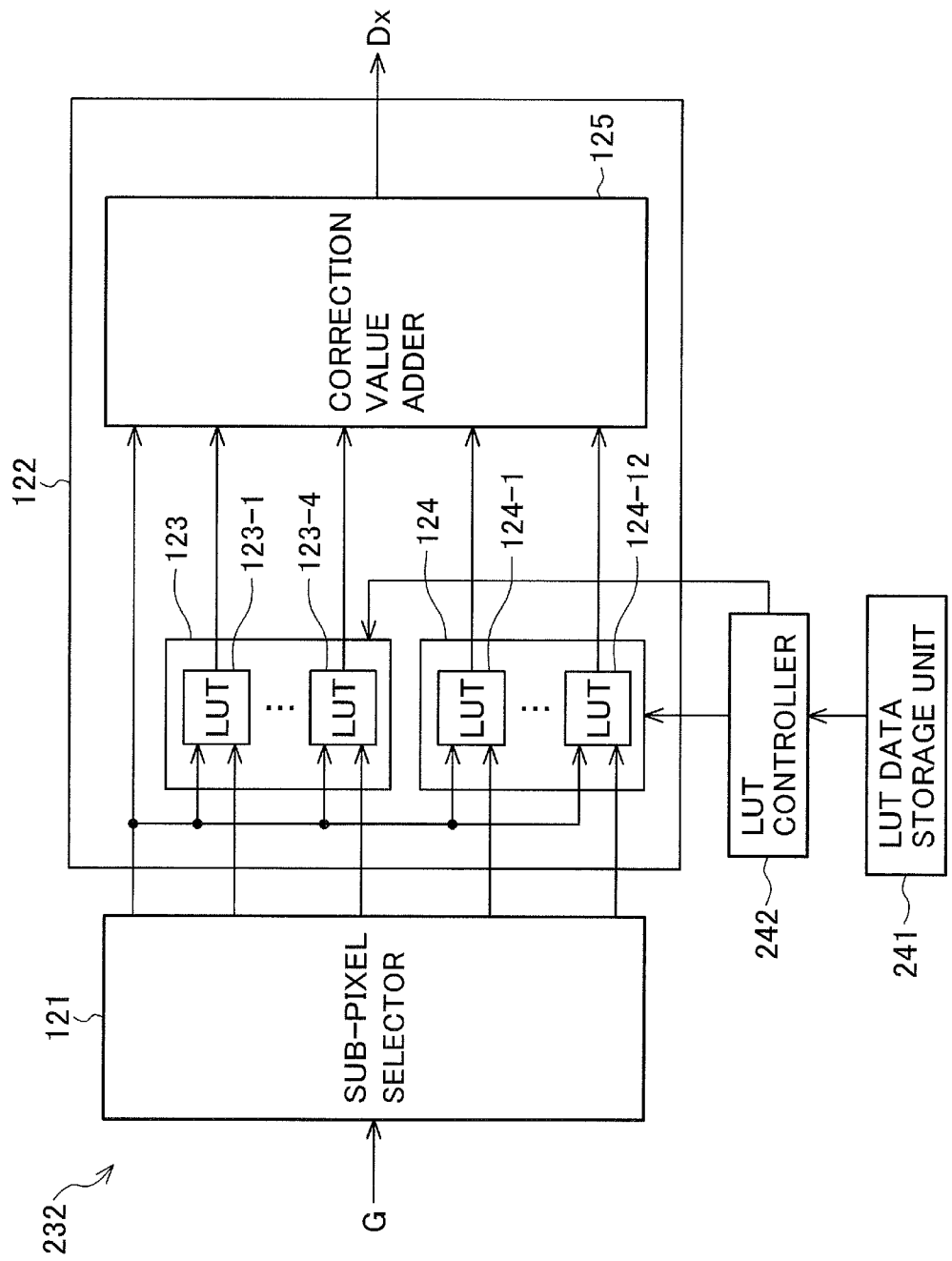

IMAGE PROCESSING DEVICE, IMAGE DISPLAY DEVICE, IMAGE PROCESSING METHOD, AND IMAGE PROCESSING PROGRAM

TECHNICAL FIELD

The present invention relates to an image processing device, an image display device, an image processing method, and an image processing program.

BACKGROUND ART

Technology has been developed that enables different images to be perceived from different directions on the same display screen by use of a liquid crystal display device and a parallax optical element such as a parallax barrier, which is a light blocking barrier, or a lenticular screen or the like (Patent References 1 and 2). Among the products that have been developed by use of this technology are dual view displays that can simultaneously display a navigation image to the driver's seat and a television image to the passenger's seat, and naked eye 3D displays that can present the left eye and right eye with images having a parallax offset without the use of special glasses.

A problem known as crosstalk, in which an image that should be presented in one direction is perceived superimposed on an image that should be presented in another direction, occurs in display devices such as the above.

Crosstalk is produced by various factors; one type of crosstalk is electrical crosstalk that arises because the electrical signal for one sub-pixel electrically affects adjacent sub-pixels. Patent Reference 3 discloses a technique for correcting such electrical crosstalk by providing LUTs (lookup tables) corresponding to the signal level of the sub-pixel to be corrected and the signal levels of adjacent sub-pixels and correcting the signal level of the sub-pixel to be corrected on the basis of the signal levels of the adjacent sub-pixels.

When a display device puts multiple images on the same display screen and displays them in different directions in order to display separately directed images or to display a 3D image, crosstalk may conceivably arise from a structure such as the parallax barrier, lenticular screen, or the like that is not present in an ordinary liquid crystal display device. One example is optical crosstalk that occurs when image light that should be presented in one direction leaks out in another direction. Patent Reference 4 discloses a technique for correcting such optical crosstalk by correcting the gradation level of a sub-pixel to be corrected according to the gradation levels of sub-pixels of the same color in adjacent pixels.

Liquid crystal displays also have the drawback of being unable to respond quickly enough to fast-changing moving pictures because when drive voltage is applied to a liquid crystal, a certain time is needed before the proper transmittance is attained. There are techniques for improving the response speed of a liquid crystal to solve this problem (Patent References 5 and 6). Patent Reference 5 discloses a method that compares the current image data and the image data one frame before, supplies the liquid crystal panel with a liquid crystal drive signal corresponding to an image data value greater than the present image data value when the current image data value is greater than the image data value one frame before, and supplies the liquid crystal panel with a liquid crystal drive signal corresponding to an image data value less than the present image data value when the current image data value is less than the image data value one frame before. Patent Reference 6 discloses a method that detects field-to-field level changes of respective pixels from the input image signal and the image signal one field before and adds these level changes to the input image signal.

PRIOR ART REFERENCES

Patent References

Patent Reference 1: Japanese Patent No. 4530267
Patent Reference 2: Japanese Patent No. 4367775
Patent Reference 3: Japanese Patent Application Publication No. 2006-23710
Patent Reference 4: Japanese Patent No. 4375468
Patent Reference 5: Japanese Patent No. 2616652
Patent Reference 6: Japanese Patent No. 3167351

SUMMARY OF THE INVENTION

Problems to be Solved by the Invention

An image display device in which a plurality of images on the same display screen are displayed in different directions should be able to handle fast-changing moving pictures, and it is also desirable for crosstalk to be made inconspicuous.

Therefore, an object of the present invention is to provide an image processing device, an image display device, an image processing method, and an image processing program that can make crosstalk less perceptible and are capable of handling fast-changing moving pictures.

Means for Solving the Problems

An image processing device according to the present invention processes image data representing a combined image including multiple images that are displayed in mutually differing directions from a single display screen of a display. The image processing device includes a crosstalk correction processor for performing a correction process on the image data to correct crosstalk occurring when the image is displayed on the display, and a response speed improvement correction processor for performing a correction process on the image data to improve the response speed of the display. The response speed improvement correction processor performs its correction process based on the image data to be corrected. The crosstalk correction processor performs, in its correction process, an electrical crosstalk correction process, based on the image data as corrected by the response speed improvement correction processor, to correct electrical crosstalk.

An image display device according to the present invention includes the above image processing device and a display for displaying the multiple images in the mutually differing directions, based on the image data as corrected by the image processing device.

An image processing method according to the present invention processes image data representing a combined image including multiple images that are displayed in mutually differing directions from a single display screen of a display. The image processing method includes a crosstalk correction processing step for performing a correction process on the image data to correct crosstalk occurring when the image is displayed on the display, and a response speed improvement correction processing step for performing a correction process on the image data to improve the response speed of the display. The correction process in the response speed improvement correction processing step is based on the image data to be corrected. An electrical crosstalk correction process, based on the image data as corrected in the response speed improvement correction processing step, is performed in the correction process in the crosstalk correction processing step to correct electrical crosstalk.

An image processing program according to the present invention processes image data representing a combined image including multiple images that are displayed in mutually differing directions from a single display screen of a display. The image processing program causes a computer to execute a crosstalk correction processing step for performing a correction process on the image data to correct crosstalk occurring when the image is displayed on the display, and a response speed improvement correction processing step for performing a correction process on the image data to improve the response speed of the display. The correction process in the response speed improvement correction processing step is based on the image data to be corrected. An electrical crosstalk correction process, based on the image data as corrected in the response speed improvement correction processing step, is performed in the correction process in the crosstalk correction processing step to correct electrical crosstalk.

Effect of the Invention

According to the invention, it is possible to handle fast-changing moving pictures and to make crosstalk less likely to be perceived.

BRIEF DESCRIPTION OF THE DRAWINGS

FIG. 1 is a block diagram showing the configuration of an image display device in a first embodiment.

FIG. 7 is a drawing showing a sub-pixel array taken from part of the image data in FIG. 4.

FIG. 11 is a drawing showing an exemplary LOT used in the crosstalk correction processor in the first embodiment.

FIG. 24 is a block diagram showing an exemplary configuration of the crosstalk correction processor in the fifth embodiment.

MODES FOR CARRYING OUT THE INVENTION

Figure 2A:
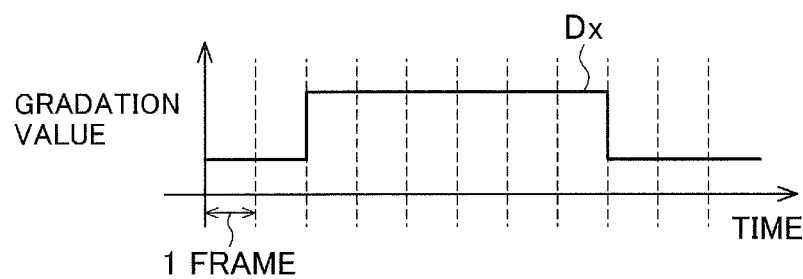
FIGS. 2(a) to 2(c) illustrate the correction processing in the response speed improvement correction processor in the first embodiment.

Embodiments of the invention will now be described with reference to the drawings.

First Embodiment

FIG. 1 is a block diagram schematically showing the configuration of the image display device 100 in the first embodiment. The image display device 100 is a device for displaying a plurality of images in different directions from the same display screen. That is, the image display device 100 is a device for displaying a plurality of images on the same display screen in such a way that different images can be perceived from different directions. For example, the image display device 100 may be an image display device that can display multiple directed images or 3D images. That is, the image display device 100 is, for example, a directional image display device that presents viewers in a plurality of directions with different images or a 3D image display device that presents the left eye and right eye with images having a parallax offset.

In FIG. 1, the image display device 100 includes an input terminal 1, an image data processor 101 functioning as an image processing device, and a display 4. The image data processor 101 includes a crosstalk correction processor 2 and a response speed improvement correction processor 3.

The input terminal 1 receives input of image data G. Specifically, the input terminal 1 receives input of moving image data consisting of a consecutive series of image data G (a plurality of frame images). The image data G are data or signals representing a combined image including multiple images that are displayed in different directions from the same display screen of the display 4. Specifically, the image data G are data or signals representing the gradation values of individual sub-pixels in a combination of a plurality of differing images (e.g., first and second images). Here the image data G are digital signals consisting of the gradation values of individual sub-pixels and synchronizing signals. For example, the image data G are signals output from a head unit system including a car navigation function and a DVD reproducing function, the head unit system obtaining the signals by combining a car navigation image with an image reproduced from a DVD.

The crosstalk correction processor 2 performs a correction process (hereinafter, 'a crosstalk correction process') on the image data G (i.e., image data to be corrected) input to the input terminal 1 to correct for crosstalk occurring when the images are displayed on the display 4 and outputs the corrected image data Dx. Specifically, based on the image data G to be corrected, the crosstalk correction processor 2 performs a correction process to mitigate or eliminate the effects of crosstalk: more specifically, a correction process that cancels out gradation level variations due to crosstalk. The crosstalk correction processor 2 specifically corrects the gradation value of each sub-pixel of the image data G input to the input terminal 1. In one aspect, the crosstalk correction processor 2 performs, as the above correction process, an optical crosstalk correction process for correcting optical crosstalk and an electrical crosstalk correction process for correcting electrical crosstalk. The correction processing performed by the crosstalk correction processor 2 will be described in detail later.

Based on image data Dx as corrected by the crosstalk correction processor 2, the response speed improvement correction processor 3 performs a correction process (hereinafter, 'a response speed improvement correction process') on the image data Dx to improve the response speed of the display 4 and outputs the corrected image data Dj. That is, the response speed improvement correction processor 3 performs, on the image data Dx, a correction process for mitigating or eliminating delay in the display response of the display 4. Specifically, the response speed improvement correction processor 3 corrects the gradation value of each sub-pixel in the image data Dx, based on changes in the gradation value of each sub-pixel in the image data Dx, so as to emphasize the changes in the gradation value of each sub-pixel in the image data Dx.

In one aspect, based on changes of gradation value over one frame interval, which can be obtained by comparing the current image data Dx and the image data one frame before, the response speed improvement correction processor 3 corrects the image data Dx so as to speed up the response of the display 4 to the gradation value changes. Specifically, the response speed improvement correction processor 3 corrects the image data Dx so that the gradation level of the display 4 reaches the gradation level indicated by the image data Dx within one frame interval. More specifically, it corrects the image data Dx so that the liquid crystal attains the transmittance specified by the image data Dx within one frame interval. As the image data one frame before, the image data Dx one frame before are used, for example, but the image data G or Dj one frame before may be used instead. The image data one frame before are held in the response speed improvement correction processor 3, for example. The response speed improvement correction processor 3 specifically corrects the gradation value of each sub-pixel in the image data Dx according to the change in the gradation value of the sub-pixel.

FIGS. 2(*a*) to 2(*c*) illustrate the correction processing performed by the response speed improvement correction processor 3. The correction processing performed by the response speed improvement correction processor 3 will now be described with reference to FIGS. 2(*a*) to 2(*c*) by focusing on one sub-pixel of the image data and display 4.

FIG. 2(*a*) represents the temporal change of its gradation value in the image data Dx; FIG. 2(*b*) represents the temporal change of its gradation value in the corrected image data Dj; FIG. 2(*c*) represents the temporal change in the transmittance of the liquid crystal of the display 4. In FIG. 2(*c*), the solid line represents the response characteristic of the liquid crystal when a drive voltage is applied according to image data Dj; the dashed line represents the response characteristic of the liquid crystal when a drive voltage is applied according to image data Dx.

As shown in FIGS. 2(*a*) and 2(*b*), when a gradation value in the image data Dx changes, the response speed improvement correction processor 3 adds a correction value corresponding to the change in the gradation value to the gradation value in the image data Dx to generate the gradation value in the corrected image data Dj. When the change in the gradation value is positive (i.e., when the gradation value increases), the correction value is positive, and when the change in the gradation value is negative (i.e., when the gradation value decreases), the correction value is negative. The magnitude of the correction value is determined by, for example, the magnitude of the change in the gradation value. In the example in FIGS. 2(*a*) and 2(*b*), when the gradation value in the image data Dx increases, a correction V1 corresponding to the increase in the gradation value is added to the gradation value in the image data Dx to generate the gradation value in the corrected image data Dj. When the gradation value in the image data Dx decreases, a correction V2 corresponding to the decrease in the gradation value is subtracted from the gradation value in the image data Dx to generate the gradation value in the corrected image data Dj.

The response speed improvement correction processor 3 obtains the correction values by using, for example, a LUT (lookup table) in which changes in gradation value are associated with correction values, based on the gradation value in the current image data Dx and the gradation value in the image data one frame before. It will be appreciated that correction values may be obtained by other methods, such as by a calculation using a mathematical function, for example.

By the application of a drive voltage according to the gradation value in the corrected image data Dj to the liquid crystal, the transmittance of the liquid crystal attains the transmittance corresponding to the gradation value in the image data Dx within about one frame interval, as indicated by the solid line in FIG. 2(*c*). If a drive voltage according to the gradation value in the image data Dx is applied to the liquid crystal, the transmittance of the liquid crystal does not reach the transmittance corresponding to the gradation value in the image data Dx within one frame interval, as indicated by the dashed line in FIG. 2(*c*).

The correction process performed by the response speed improvement correction processor 3 need only be a process that can improve the response speed of the display 4; it is not limited to the process described above.

The display 4 displays an image on the basis of the image data Dj corrected by the image data processor 101. Specifically, the display 4 displays a plurality of images in different directions, based on the image data Dj after the crosstalk correction process and the response speed improvement correction process.

The display 4 and image data G will now be described in detail. A case in which first and second images are displayed in mutually different directions will be taken as an example in the description.

The display 4 displays images in mutually differing first and second directions, and has a configuration in which a plurality of pixels are arranged, each pixel including one or more sub-pixels. The display 4 is configured so that sub-pixels displayed in the first direction alternate with sub-pixels displayed in the second direction.

The image data G represent the gradation value of each sub-pixel in a combined image combining the first and second images that are displayed in mutually differing directions, the combined image being an image in which a plurality of pixels are arranged, each pixel including one or more sub-pixels, and sub-pixels constituting the first image alternate with sub-pixels constituting the second image. Put differently, the image data G represent gradation values corresponding to respective sub-pixels of the display 4. For example, when a liquid crystal display device having a liquid crystal panel is used as the display 4, the image data G are image data representing the gradation value input to each of the plurality of pixel electrodes with which the liquid crystal panel is provided (specifically, the gradation value corresponding to the drive voltage applied to each pixel electrode). The gradation values actually input to the pixel electrodes of the liquid crystal panel are the gradation values of the corrected image data (image data Dj in FIG. 1) obtained by correction of the gradation values of image data G.

Each sub-pixel of the display 4 displays, based on the gradation value of the sub-pixel in the image data corresponding to the sub-pixel of the display 4, light at a gradation level responsive to the gradation value. More specifically, each sub-pixel of the display 4 that is displayed in the first direction displays, based on the gradation value of the sub-pixel in the image data constituting the first image and corresponding to the sub-pixel of the display 4, light in the first direction at a gradation level responsive to the gradation value. Each sub-pixel of the display 4 that is displayed in the second direction displays, based on the gradation value of the sub-pixel in the image data constituting the second image and corresponding to the sub-pixel of the display 4, light in the second direction at a gradation level responsive to the gradation value. This causes the first image to be displayed in the first direction and the second image to be displayed in the second direction.

In one aspect, in the display 4 and image data G, one pixel consists of three sub-pixels: one red (R), one green (G), and one blue (B). A plurality of pixels are arrayed two-dimensionally, aligned in two different directions (e.g., horizontally and vertically). Sub-pixels constituting the first image alternate with sub-pixels constituting the second image at intervals of one sub-pixel in the two different directions.

Figure 3:
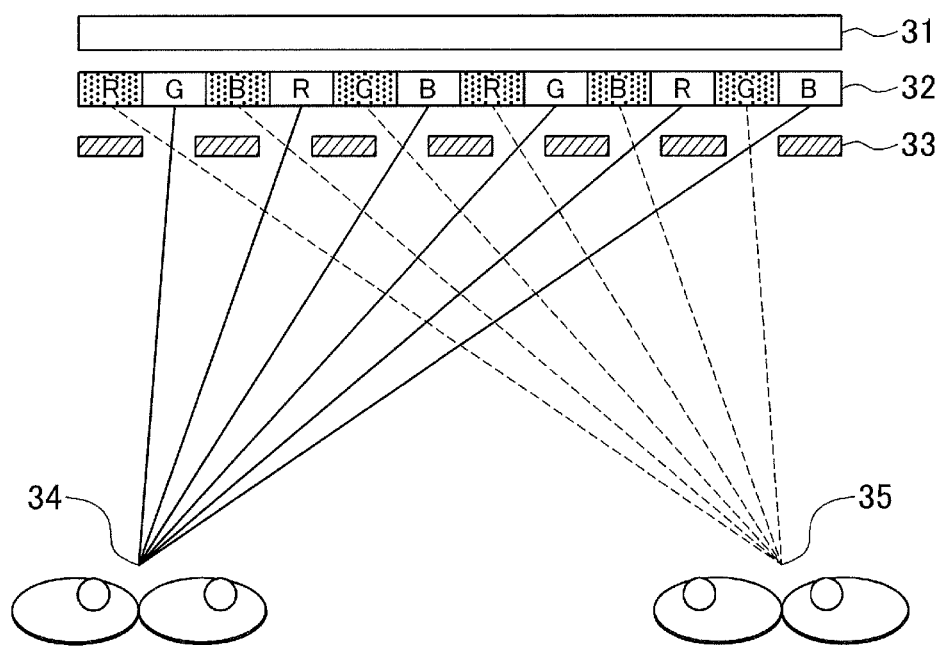
FIG. 3 is a schematic plan view showing an exemplary configuration of the display unit.

FIG. 3 is a schematic plan view showing an exemplary configuration of the display 4. In FIG. 3, the display 4 has a structure including a liquid crystal display device and a checkerboard pattern parallax barrier, providing a dual screen display capability. Specifically, the display 4 includes a backlight 31, a liquid crystal panel 32, and a parallax barrier 33. In the liquid crystal panel 32, a three-color group of sub-pixels (R, G, B) constitutes one pixel, and a plurality of pixels are laid out in sequences. The parallax barrier 33 blocks the light of the sub-pixels in such a way that sub-pixels displayed to a viewer 34 viewing the liquid crystal panel 32 from the left alternate with sub-pixels displayed to a viewer 35 viewing the liquid crystal panel 32 from the right at intervals of one sub-pixel. Accordingly, when the display 4 is viewed from the direction of the viewer 34 on the left, every other pixel in the liquid crystal panel 32 is shielded by the parallax barrier 33, leaving a net half of the liquid crystal panel 32 visible as the left image area. When the display 4 is viewed from the viewer 35 on the right, the sub-pixels shielded with respect to the direction of the viewer 34 are visible, the sub-pixels perceived by the viewer 34 are shielded, and the right net half image area of the liquid crystal panel 32 is perceived.

FIG. 3 shows a row of sub-pixels aligned in the horizontal direction, but the plurality of sub-pixels are arrayed two dimensionally, in the horizontal and vertical directions. The parallax barrier 33 has a checkerboard configuration in such a way that sub-pixels displayed to the viewer 34 on the left alternate with sub-pixels displayed to the viewer 35 on the right at intervals of one sub-pixel in both the horizontal and vertical directions.

Figure 4:
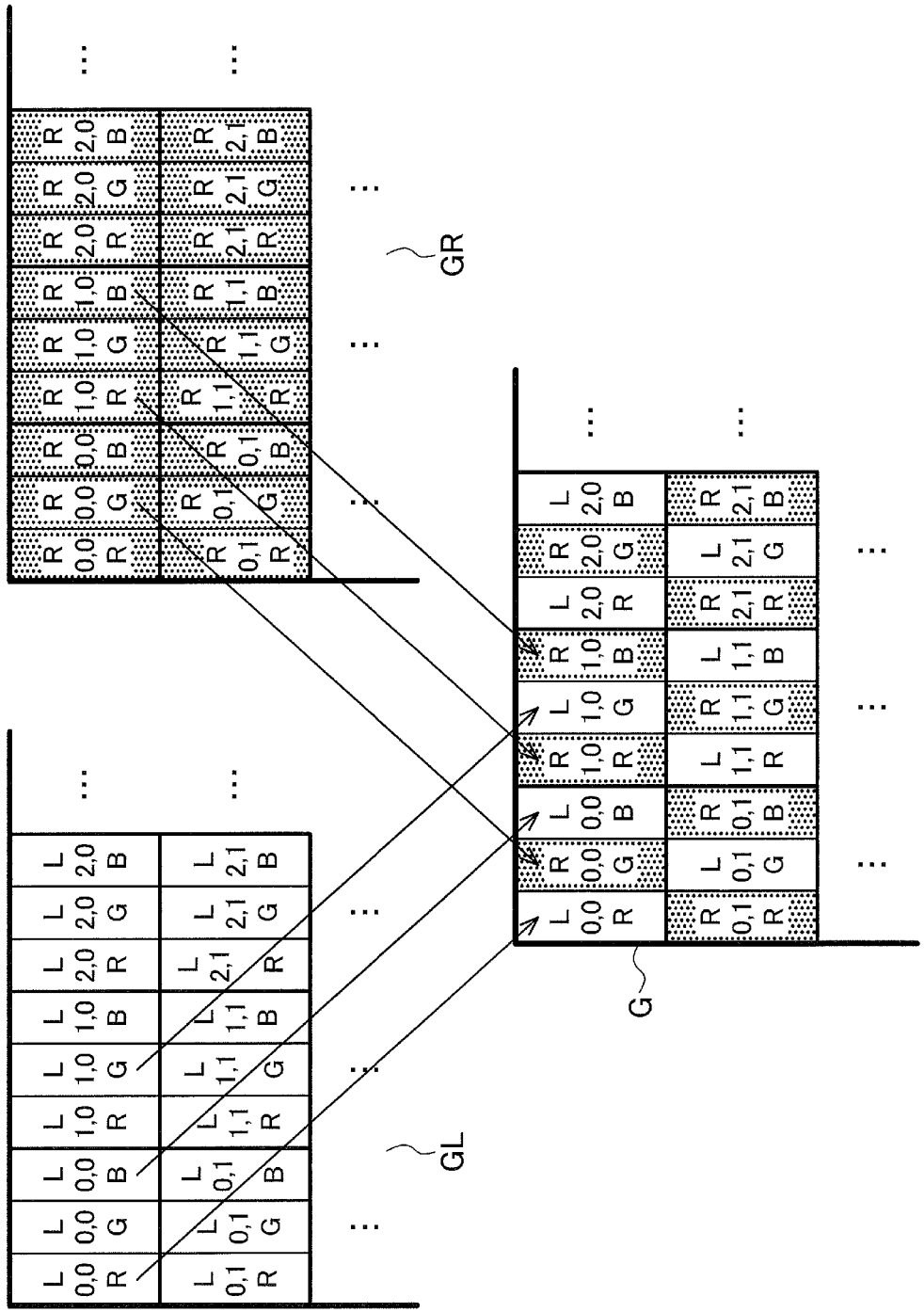
FIG. 4 is a drawing showing an exemplary sequence of sub-pixels in image data.

FIG. 4 is a drawing showing an exemplary arrangement of sub-pixels in the image data G. This arrangement corresponds to the display 4 in FIG. 3, and has a configuration such that the two images are combined in a checkerboard pattern of sub-pixels. Each cell in FIG. 4 represents a sub-pixel. The first row in each of the sub-pixel cells indicates the image to which the sub-pixel belongs (or the viewing direction to which the sub-pixel is displayed); 'L' denotes the left image, to be presented to the viewer on the left (or in the left direction); 'R' denotes the right image, to be presented to the viewer on the right (or in the right direction). The second row in each of the sub-pixel cells indicates the coordinates of the pixel in which the sub-pixel is included, each set of coordinates including a horizontal coordinate x and a vertical coordinate y. The third row in each of the sub-pixel cells indicates the color of the sub-pixel (R, G, or B).

In FIG. 4, a three-color group of sub-pixels (R, G, B) constitutes one pixel, and the plurality of sub-pixels are arranged two-dimensionally in the horizontal and vertical directions. The sub-pixels constituting the left image alternate with the sub-pixels constituting the right image at intervals of one sub-pixel in the horizontal direction and vertical direction.

Such image data G can be obtained, for example, as shown in FIG. 4, by selectively combining the gradation values of sub-pixels in the original image data GL for the left image and the original image data GR for the right image, taking sub-pixels selectively from both in a checkerboard pattern. The data can be obtained, specifically, by combining the gradation values of the sub-pixels in the two groups of image data GL and GR in the sequence R in the left image, G in the right image, B in the left image, R in the right image, . . . on even numbered lines (lines with an even coordinate value y), and in the sequence R in the right image, G in the left image, B in the right image, R in the left image, . . . on odd numbered lines (lines with an odd coordinate value y).

Electrical and optical crosstalk will now be described.

Electrical crosstalk occurs when an electrical signal (drive signal) for a certain sub-pixel electrically affects adjacent sub-pixels. For example, in a liquid crystal display device in which multiple source lines (signal lines) and multiple gate lines (scanning lines) are arranged in a matrix pattern, and sub-pixels are disposed at positions corresponding to the intersections of the source lines and gate lines, electrical crosstalk is thought to arise from the effect from capacitive coupling due to parasitic capacitance between the source lines of mutually adjacent sub-pixels and between the gate lines of mutually adjacent sub-pixels. This electrical crosstalk effect appears when the voltage value of the affected sub-pixel deviates from the voltage value corresponding to the gradation value of the sub-pixel, changing the quantity of light seen from the sub-pixel.

Optical crosstalk occurs when image light that should be presented in a certain direction leaks out in another direction. For example, the structure of a multiple directed image display device or 3D image display device using a parallax barrier can produce two types of optical crosstalk. One is due to slit diffraction of light; the other is due to reflection of light by the parallax barrier.

Figure 5:
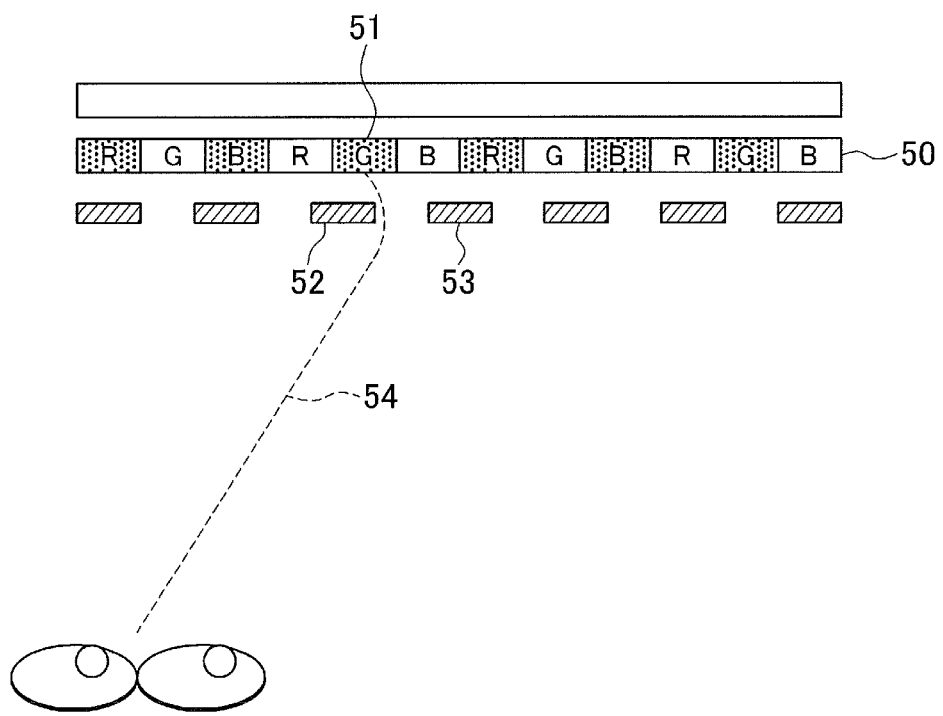
FIG. 5 is a drawing illustrating optical crosstalk due to optical diffraction.

FIG. 5 is a drawing illustrating crosstalk due to diffraction of light. Sub-pixel 51 in the liquid crystal panel 50 is a sub-pixel that should be blocked from view from the left of the liquid crystal panel 50 by parallax barrier 52. However, the distance between parallax barrier 52 and the adjacent parallax barrier 53 is narrow enough to cause diffraction, so light from the sub-pixel 51 that should be blocked comes around as indicated by diffracted light path 54 and leaks out toward the left.

Figure 6:
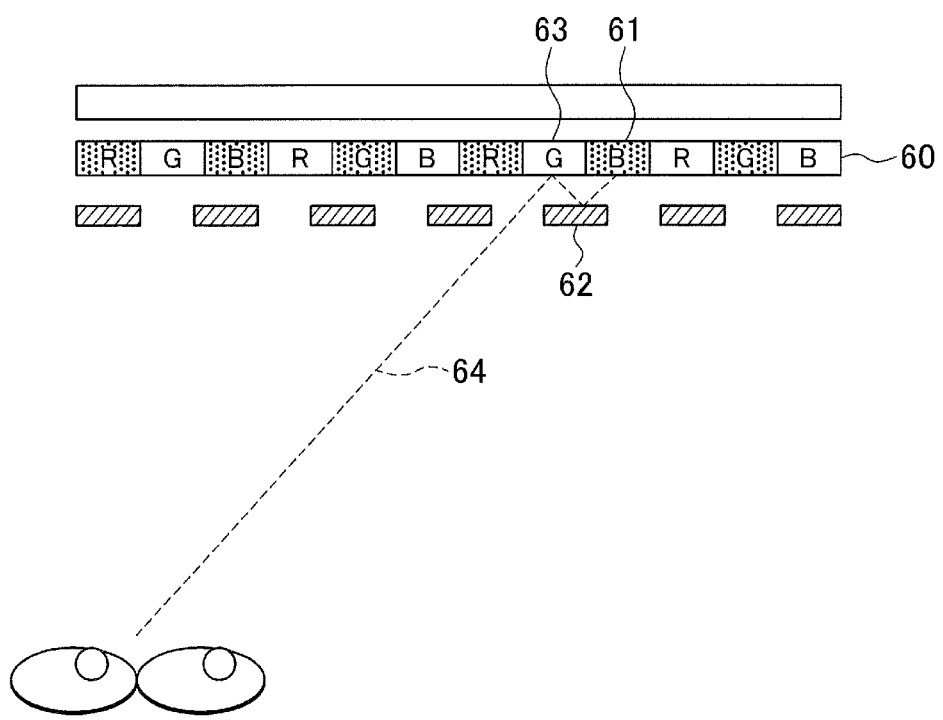
FIG. 6 is a drawing illustrating optical crosstalk due to optical reflection.

FIG. 6 is a drawing illustrating optical crosstalk due to optical reflection. Sub-pixel 61 in the liquid crystal panel 60 is a sub-pixel that should be blocked from view from the left of the liquid crystal panel 60 by parallax barrier 62. However, light from sub-pixel 61 is reflected by parallax barrier 62 and then reflected by the surface of the sub-pixel 63 adjacent to sub-pixel 61 so that, as indicated by reflected light path 64, light that should be blocked leaks out toward the left.

Figure 7:
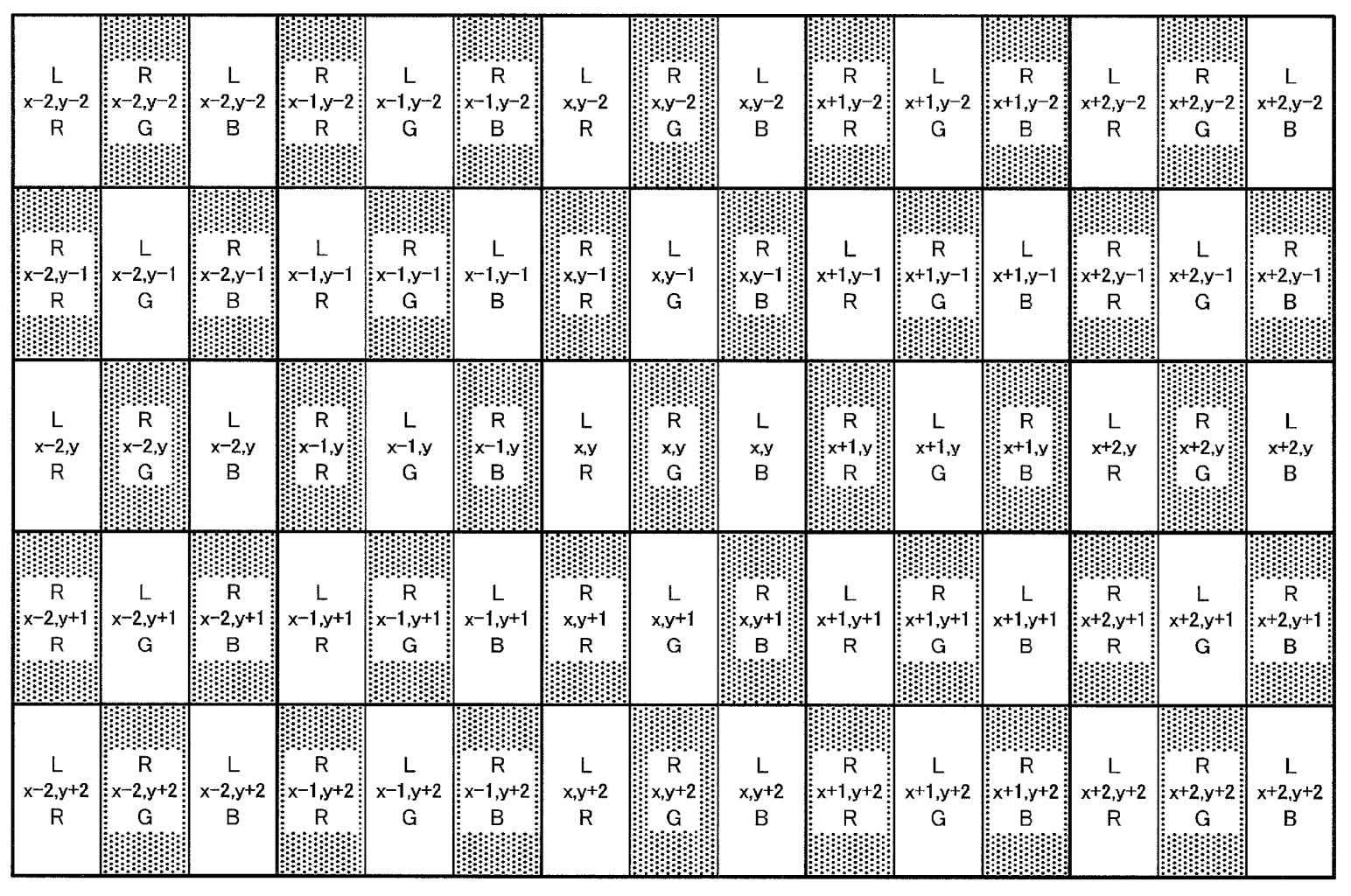

FIG. 7 is a drawing showing an array of sub-pixels in the image data G, taken from part of the image data G in FIG. 4 (5×5 pixels). The sub-pixels having crosstalk effects on a certain sub-pixel of interest (referred to below as 'the sub-pixel of interest') will be described with reference to FIG. 7.

Figure 8:
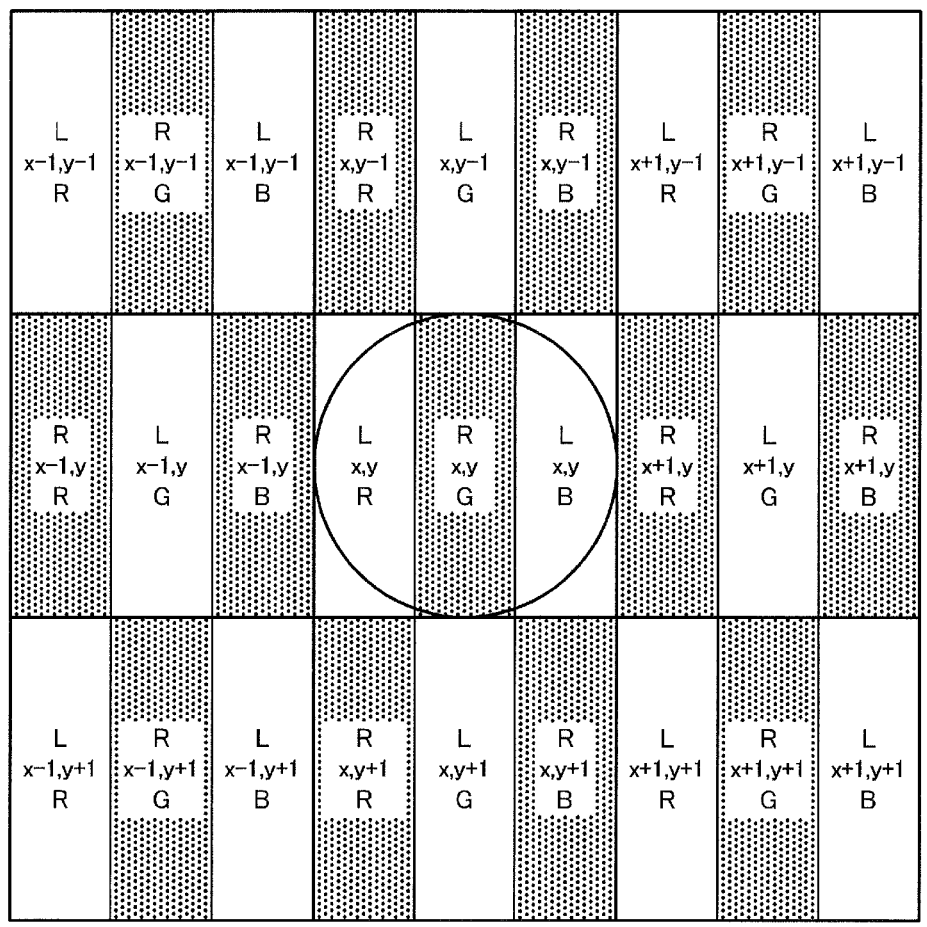
FIG. 8 is a drawing showing the adjacent pixels around the central pixel in FIG. 7.
Figure 9:
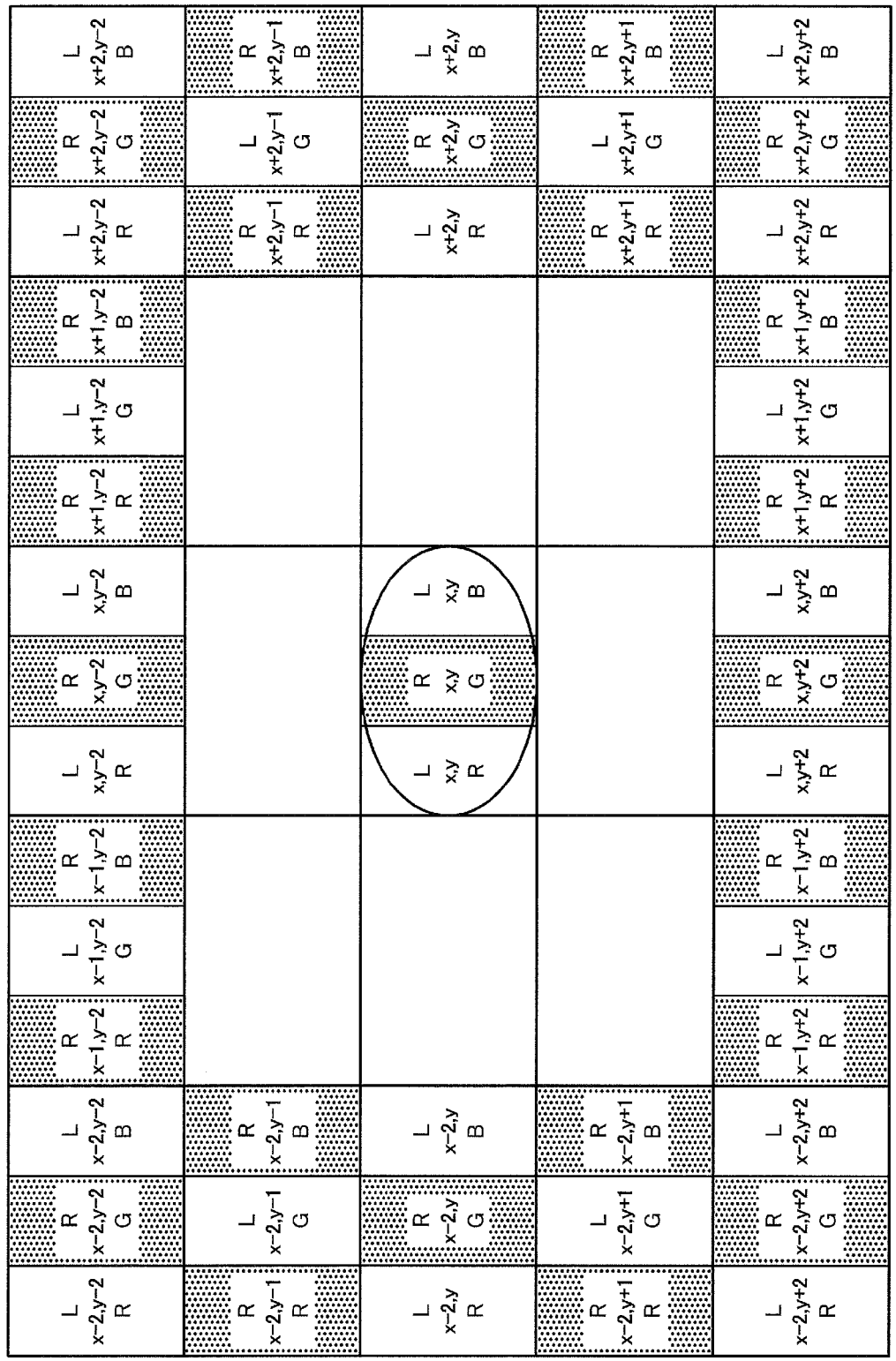
FIG. 9 is a drawing showing the surrounding pixels around the central pixel in FIG. 7.

In the following description, for a given pixel, the pixels adjacent to the given pixel will be referred to as 'adjacent pixels', and pixels surrounding the adjacent pixels will be referred to as 'surrounding pixels'. For the central pixel located at coordinates (x, y) in FIG. 7, for example, the pixels stationed adjacent in the up, down, left, right, and diagonal directions will be referred to as 'adjacent pixels', and the pixels surrounding the adjacent pixels will be referred to as 'surrounding pixels'. FIG. 8 shows the eight adjacent pixels and FIG. 9 shows the sixteen surrounding pixels.

With respect to electrical crosstalk, the effect from adjacent sub-pixels on the sub-pixel of interest is large. The electrical crosstalk effect appears in the form of a change in the amount of light emitted by the sub-pixel of interest itself, independent of the color or display direction of the sub-pixel. Accordingly, the sub-pixel of interest is affected by electrical crosstalk from adjacent sub-pixels regardless of whether they have the same color or display direction or not.

Specifically, in a liquid crystal display device with source lines and gate lines arranged in a matrix pattern, a sub-pixel of interest is affected by electrical crosstalk from the two sub-pixels adjacent to it in the source line direction (horizontal direction) and the two sub-pixels adjacent to it in the gate line direction (vertical direction), that is, a total of four sub-pixels adjacent to it in the up, down, left, and right directions. For example, in FIG. 7, the green sub-pixel at coordinates (x, y) is affected by electrical crosstalk from the red and blue sub-pixels at coordinates (x, y), the green sub-pixel at coordinates (x, y−1), and the green sub-pixel at coordinates (x, y+1).

The sub-pixel of interest may be affected by optical crosstalk from sub-pixels located in various directions, such as up, down, left, right, and diagonal directions, with respect to the sub-pixel. The sub-pixel of interest may also be affected by optical crosstalk from sub-pixels in a wide range. Specifically, the sub-pixel of interest may be affected by optical crosstalk from not only sub-pixels in the pixels adjacent to the pixel to which the sub-pixel belongs, but also from sub-pixels in the surrounding pixels. In particular, in display devices for displaying two different images in mutually differing directions on the same display screen, in order to secure sufficient luminance for the screen displayed in one direction, the light from each sub-pixel is often made stronger than in ordinary display devices. Specifically, in order to prevent the luminance of the screen displayed in one direction from being lowered by the structures of the parallax barrier or other components, multiple directed image display devices or 3D image display devices often use a backlight system with intensified emission of light, such as by placing two backlights in respective upper and lower positions, instead of the single lower backlight provided in ordinary display devices. The intensified light emitted from each sub-pixel widens the extent of optical crosstalk effects.

An optical crosstalk effect appears when light of a sub-pixel presented in the direction differing from the direction in which the sub-pixel of interest is presented but having the same color as the sub-pixel of interest is superimposed on the light from the sub-pixel of interest, changing the gradation level of the sub-pixel of interest perceived by the viewer.

Accordingly, the sub-pixel of interest is affected by optical crosstalk from sub-pixels having the same color as the sub-pixel of interest that are included in the pixels adjacent the pixel to which the sub-pixel of interest belongs or in pixels surrounding the adjacent pixels, and are presented in a direction differing from the display direction of the image to which the sub-pixel of interest belongs (i.e., belong to a different image from the sub-pixel of interest).

Figure 10:
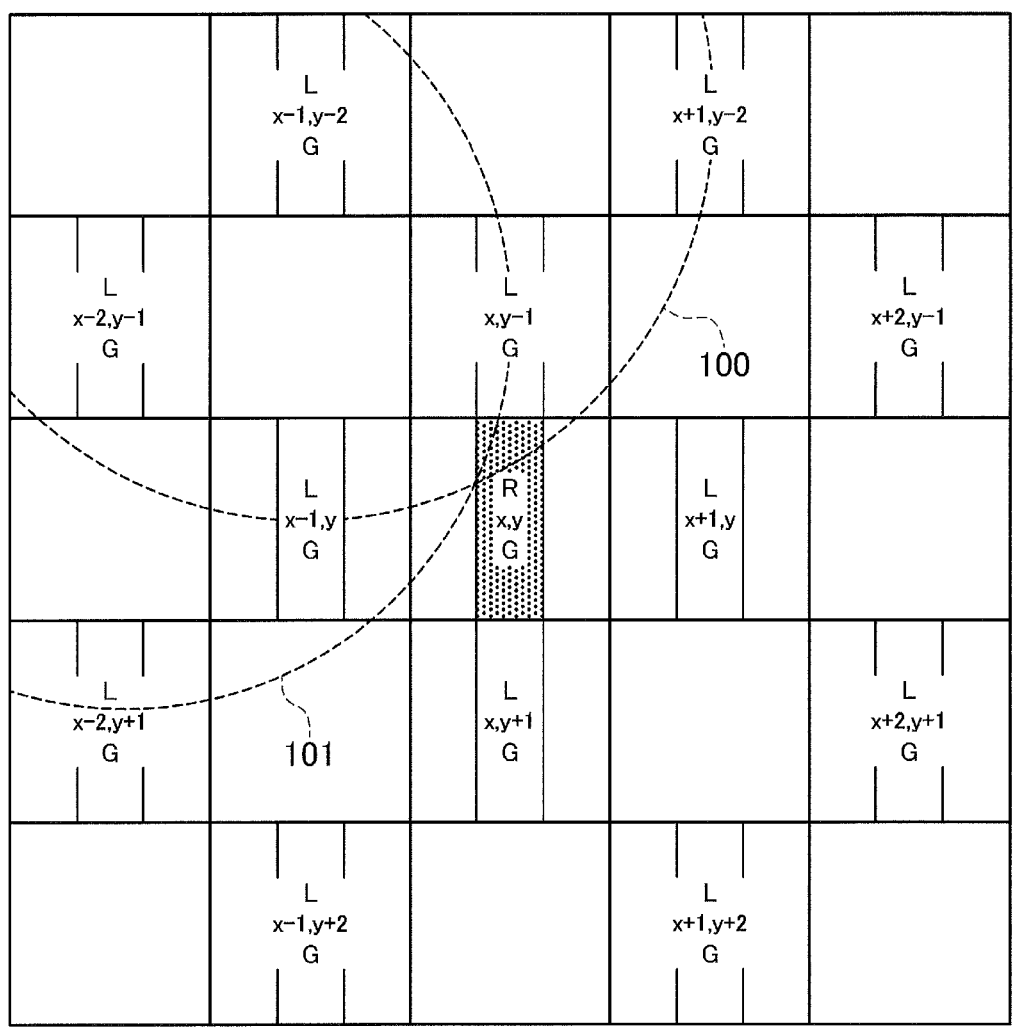
FIG. 10 is a drawing showing sub-pixels having an optical crosstalk effect on the central sub-pixel in FIG. 7.

For example, if the light from a given sub-pixel is assumed to have an optical crosstalk effect extending two pixels beyond it, then as shown in FIG. 10, the right green sub-pixel with coordinates (x, y) in FIG. 7 is affected by optical crosstalk from a total of twelve sub-pixels that are included among the adjacent pixels and surrounding pixels of the pixel with coordinates (x, y) in which the sub-pixel is included, that are displayed in the left direction, differing from the display direction of the sub-pixel, and that have the same green color as that sub-pixel. In FIG. 10, dashed line 100 indicates the extent of the effect of optical crosstalk from the left green sub-pixel with coordinates (x−1, y−2); dashed line 101 indicates the extent of the effect of optical crosstalk from the left green sub-pixel with coordinates (x−2, y−1). The right green sub-pixel with coordinates (x, y) lies within the extents of the optical crosstalk effects from the left green sub-pixel with coordinates (x−1, y−2) and the left green sub-pixel with coordinates (x−2, y−1).

An exemplary crosstalk correction process performed by the crosstalk correction processor 2 will now be described. The correction process performed by the crosstalk correction processor 2 is not limited to the process described below, however; it need only be a process that can correct crosstalk, that is, a process that can mitigate or eliminate crosstalk effects in the perceived image.

When a sub-pixel to be corrected is affected by electrical or optical crosstalk from other sub-pixels, the perceived gradation level of the sub-pixel to be corrected deviates from its proper gradation level corresponding to the gradation value of the sub-pixel to be corrected because of crosstalk effects from the other sub-pixels. The crosstalk correction processor 2 therefore corrects the gradation value of the sub-pixel to be corrected, so as to cancel out the deviation of the perceived gradation level.

It will be assumed, for example, that each sub-pixel in the image data G has a gradation scale with 256 levels (an 8 bit scale), that the gradation value of a sub-pixel A to be corrected is 15, and that the gradation value of a sub-pixel B having a crosstalk effect on sub-pixel A is 243. If these sub-pixels were to be displayed on the display 4 without correction, the gradation level of the light emitted by sub-pixel A would be raised to a level corresponding to gradation value 18 due to the crosstalk effect from sub-pixel B, so an emitted gradation level higher by +3 than the proper gradation level would be perceived. The crosstalk correction processor 2 therefore corrects the gradation value of sub-pixel A by −3, making it 12. Thus when a +3 crosstalk effect occurs, the perceived gradation level of sub-pixel A becomes the gradation level corresponding to gradation value 15, which is its proper gradation level. In this way, when the perceived gradation level becomes higher than the proper gradation level (i.e., when more emitted light is perceived), the crosstalk correction processor 2 performs a correction by reducing the gradation value of the sub-pixel to be corrected. There are cases in which the perceived gradation level becomes lower than the proper gradation level (i.e., when less emitted light is perceived); in those cases, the crosstalk correction processor 2 performs a correction that increases the gradation value of the sub-pixel to be corrected.

The degree of deviation of the perceived gradation level depends on the gradation values of the sub-pixels having crosstalk effects on the sub-pixel to be corrected. Therefore, the crosstalk correction processor 2 corrects the gradation value of the sub-pixel to be corrected according to the gradation values of the sub-pixels having crosstalk effects on the sub-pixel to be corrected. Specifically, with respect to electrical crosstalk, the crosstalk correction processor 2 corrects the gradation value of the sub-pixel to be corrected on the basis of the gradation values of the sub-pixels adjacent to the sub-pixel to be corrected. With respect to optical crosstalk, the crosstalk correction processor 2 corrects the gradation value of the sub-pixel to be corrected on the basis of the gradation values of sub-pixels having the same color as the sub-pixel to be corrected that are included in the pixels adjacent to the pixel to which the sub-pixel to be corrected belongs and in the pixels surrounding the adjacent pixels and that belong to the image differing from the image to which the sub-pixel to be corrected belongs.

The degree of deviation of the perceived gradation level also depends on the gradation value of the sub-pixel to be corrected. Therefore, in one aspect, the crosstalk correction processor 2 corrects the gradation value of the sub-pixel to be corrected according to the gradation value of the sub-pixel itself and the gradation values of the sub-pixels having crosstalk effects on the sub-pixel to be corrected. Specifically, the crosstalk correction processor 2 obtains correction values corresponding to the combination of the gradation value of the sub-pixel to be corrected and the gradation values of the sub-pixels having crosstalk effects on it and adds the correction values to the gradation value of the sub-pixel to be corrected, thereby obtaining the gradation value after crosstalk correction. The correction values can be obtained by use of LUTs, for example.

FIG. 11 is a drawing showing an exemplary LUT used by the crosstalk correction processor 2. The LUT stores correction values associated with combinations of the gradation value of the sub-pixel to be corrected and the gradation value of a sub-pixel having a crosstalk effects on it; when a combination of the gradation value of the sub-pixel to be corrected and the gradation value of the sub-pixel having a crosstalk effect on it is input, an associated correction value is output. From the viewpoint of reducing the size (number of bits) of the LUT, the LUT in FIG. 11 stores, instead of the corrected gradation values, correction values indicating the difference between the gradation values before and after the correction. The correction values stored in the LUT are derived through experiment.

When the crosstalk correction processor 2 corrects crosstalk from a plurality of sub-pixels affecting the sub-pixel to be corrected, it corrects the gradation value of the sub-pixel to be corrected according to the gradation values of the plurality of sub-pixels. For example, the crosstalk correction processor 2 obtains, for each of the plurality of sub-pixels having crosstalk effects, a correction value corresponding to the combination of this sub-pixel and the sub-pixel to be corrected, and adds the obtained plurality of correction values to the gradation value of the sub-pixel to be corrected.

Figure 12:
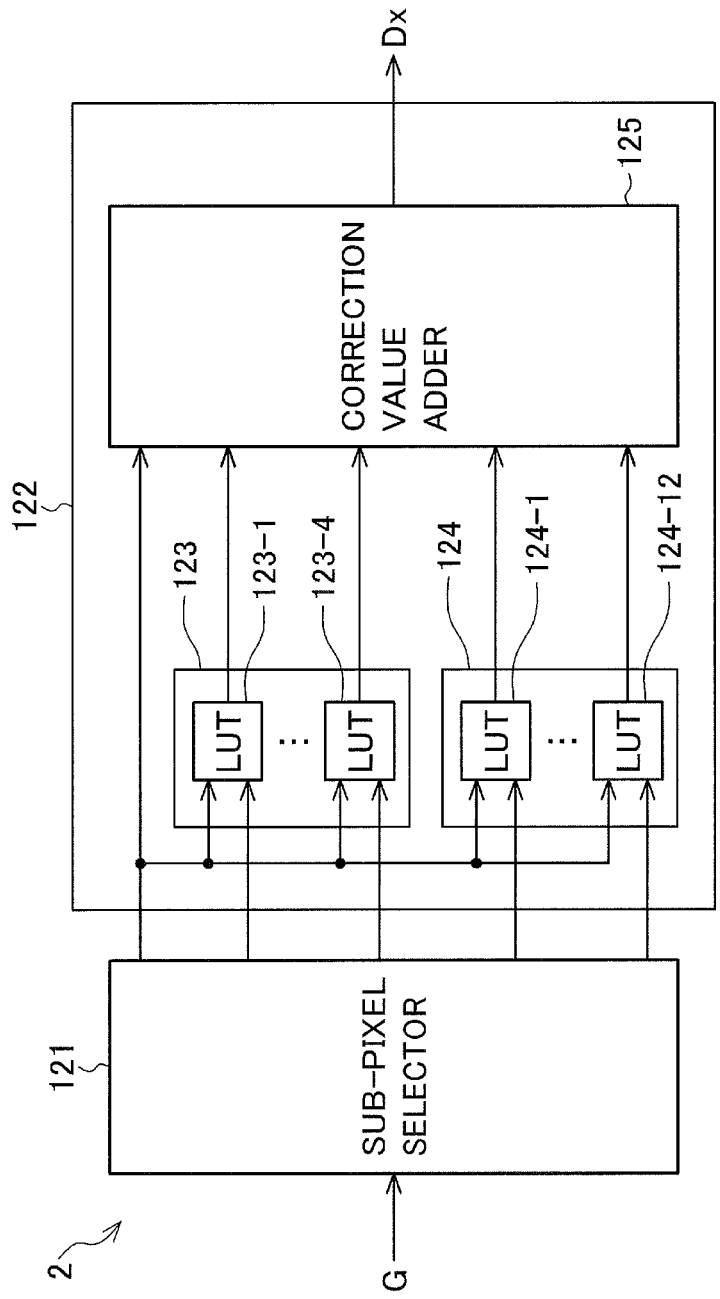
FIG. 12 is a block diagram showing an exemplary configuration of the crosstalk correction processor in the first embodiment.

FIG. 12 is a block diagram showing an exemplary configuration of the crosstalk correction processor 2. The configuration of the crosstalk correction processor 2 will be described below with reference to FIG. 12. The crosstalk correction processor 2 in FIG. 12 includes a sub-pixel selector 121 and a corrector 122.

The sub-pixel selector 121 receives the image data G, and selects the gradation value of a sub-pixel to be corrected and the gradation values of sub-pixels having crosstalk effects on the sub-pixel to be corrected (i.e., the gradation values of the sub-pixels used for the correction) from the image data G. Specifically, with respect to electrical crosstalk, the sub-pixel selector 121 selects, as the gradation values of sub-pixels having crosstalk effects, the gradation values of a total of four sub-pixels adjacent (up, down, left, right) to the sub-pixel to be corrected. For optical crosstalk, the sub-pixel selector 121 selects, as the gradation values of sub-pixels having crosstalk effects, the gradation values of the sub-pixels with the same color as the sub-pixel to be corrected included among the pixels adjacent to the pixel in which the sub-pixel to be corrected is included and in the pixels surrounding the adjacent pixels, and belonging to the image differing from the image to which the sub-pixel to be corrected belongs. For example, when the right green sub-pixel with coordinates (x, y) in FIG. 7 is corrected, the sub-pixel selector 121 selects the gradation values of a total of twelve sub-pixels having the same green color as the sub-pixel to be corrected, shown in FIG. 10, that are included in the adjacent pixels and surrounding pixels with respect to the pixel with coordinates (x, y) and are displayed in the left direction, differing from the display direction of the sub-pixel to be corrected.

The corrector 122 corrects the gradation value of the sub-pixel to be corrected that was selected by the sub-pixel selector 121, according to the gradation values of the sub-pixels selected by the sub-pixel selector 121 as having crosstalk effects.

The corrector 122 includes an electrical crosstalk correction value generator 123, an optical crosstalk correction value generator 124, and a correction value adder 125.

The electrical crosstalk correction value generator 123 generates correction values for correcting electrical crosstalk, based on the gradation value of the sub-pixel to be corrected and the gradation values of the sub-pixels having electrical crosstalk effects on the sub-pixel to be corrected.

The optical crosstalk correction value generator 124 generates correction values for correcting optical crosstalk, based on the gradation value of the sub-pixel to be corrected and the gradation values of the sub-pixels having optical crosstalk effects on the sub-pixel to be corrected.

The correction value adder 125 adds the correction values generated by the electrical crosstalk correction value generator 123 and the correction values generated by the optical crosstalk correction value generator 124 to the gradation value of the sub-pixel to be corrected, and outputs the corrected gradation value of the sub-pixel to be corrected.

In the example in FIG. 12, the electrical crosstalk correction value generator 123 includes a total of four electrical crosstalk correction LUTs 123-1 to 123-4 corresponding to a total of four sub-pixels adjacent (up, down, left, right) to the sub-pixel to be corrected. Each of the four electrical crosstalk correction LUTs 123-1 to 123-4 converts the combination of the gradation value of the sub-pixel to be corrected and the gradation value of the sub-pixel corresponding to the LUT to a correction value and outputs it to the correction value adder 125.

The optical crosstalk correction value generator 124 includes a total of twelve optical crosstalk correction LUTs 124-1 to 124-12 corresponding to the total of twelve sub-pixels having optical crosstalk effects, shown in FIG. 10. Each of the twelve optical crosstalk correction LUTs 124-1 to 124-12 converts the combination of the gradation value of the sub-pixel to be corrected and the gradation value of the sub-pixel corresponding to the LUT to a correction value and outputs the correction value to the correction value adder 125.

The correction value adder 125 adds the total of four correction values output from the four electrical crosstalk correction LUTs 123-1 to 123-4 and the total of twelve correction values output from the twelve optical crosstalk correction LUTs 124-1 to 124-12 to the gradation value of the sub-pixel to be corrected, and outputs the corrected gradation value.

In the above description, a case in which a green sub-pixel is corrected is taken as an example, but corrections for sub-pixels of other colors are performed in the same way.

Figure 13:
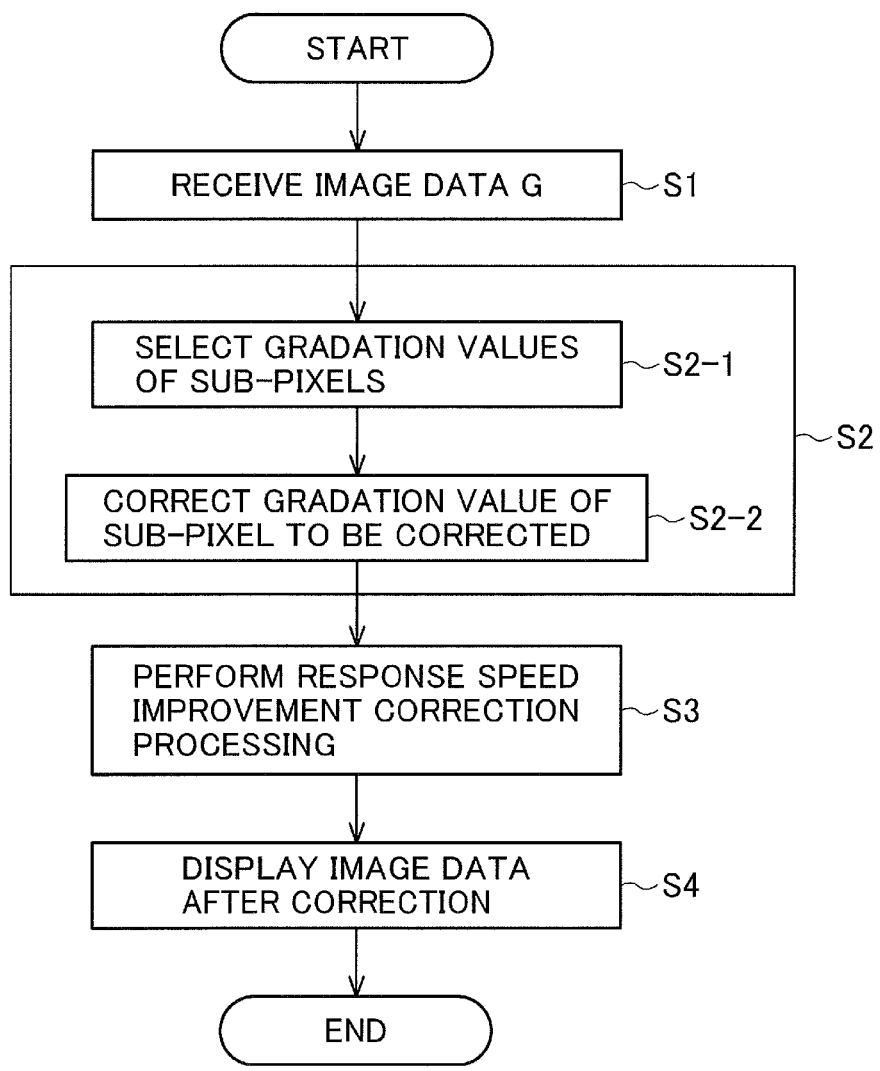
FIG. 13 is a flowchart illustrating the operation of the image display device in the first embodiment.

FIG. 13 is a flowchart illustrating the operation of the image display device 100 in the first embodiment. An example of the operation of the image display device 100 will be described below with reference to FIG. 13.

The image display device 100 receives image data G representing a combined image including multiple images that are displayed in different directions from the same display screen of the display 4 (S1). For example, the image display device 100 receives image data G representing the gradation values of the sub-pixels in a combined image including first and second images that are to be displayed in mutually differing directions, each image including an array of a plurality of pixels, each pixel including one or more sub-pixels, sub-pixels in the first image alternating with sub-pixels in the second image.

Next, the image display device 100 performs corrections of electrical crosstalk and optical crosstalk on the image data G (S2). Specifically, as an electrical crosstalk correction, it corrects the gradation value of the sub-pixel to be corrected of the image data G on the basis of the gradation values of sub-pixels adjacent to the sub-pixel to be corrected. As an optical crosstalk correction, it corrects the gradation value of the sub-pixel to be corrected of the image data G on the basis of the gradation values of sub-pixels having the same color as the sub-pixel to be corrected that are included in the pixels adjacent to the pixel to which the sub-pixel to be corrected belongs and pixels surrounding the adjacent pixels and occur in the image differing from the image to which the sub-pixel to be corrected belongs.

Step S2 includes steps S2-1 and S2-2.

In step S2-1, the image display device 100 selects, from the image data G, the gradation value of the sub-pixel to be corrected and the gradation values of the sub-pixels having crosstalk effects on the sub-pixel to be corrected (i.e., the gradation values of the sub-pixels to be used for the correction).

In step S2-2, on the basis of the gradation values of the sub-pixels selected in step S2-1 as having crosstalk effects, the image display device 100 corrects the gradation value of the sub-pixel to be corrected that was selected in step S2-1.

Next, the image display device 100 performs a correction process on the image data as corrected in step S2 to improve the response speed of the display 4 (S3). Specifically, on the basis of the changes in gradation values over one frame interval obtained by comparison between the image data as corrected in step S2 and the image data one frame before those image data, the image display device 100 corrects the image data as corrected in step S2 so that the liquid crystal of the display 4 attains the proper transmittance within one frame interval.

The image display device 100 then displays the image data as corrected in step S3 (S4). Specifically, on the basis of the corrected image data, the image display device 100 displays multiple images (e.g., first and second images) in different directions (e.g., first and second directions).

As described above, in this embodiment, the image processing device receives input of image data representing a combined image including multiple images that are displayed in different directions from the same display screen of the display unit and performs, on the image data, a crosstalk correction process for correcting crosstalk occurring when the image is displayed by the display unit and a response speed improvement correction process for improving the response speed of the display unit. Therefore, this embodiment makes it possible to correct crosstalk, make crosstalk effects less perceptible, and also improve the response speed of the display unit, thereby providing the capability to handle fast-changing moving pictures.

Figure 2B:
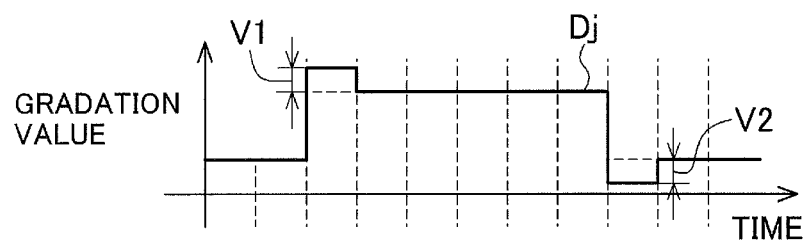
Figure 2C:
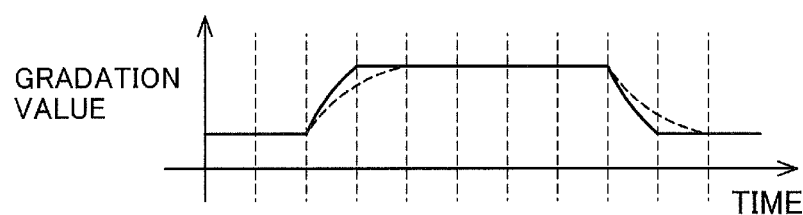

In this embodiment, the image processing device performs a crosstalk correction process based on the image data to be corrected (input image data); then, based on the image data after the crosstalk correction process, it performs a response speed improvement correction process. In this way, since the crosstalk correction process is performed by use of the image data before the response speed improvement correction process, optical crosstalk can be corrected more effectively. Specifically, experiments have shown that optical crosstalk can be corrected more successfully when the optical crosstalk correction is made on the image data (input image data) before the response speed improvement correction process than when the optical crosstalk correction is made on the image data after the response speed improvement correction process. This is thought to be true for the following reason. Optical crosstalk is produced by the image light actually displayed on the display unit, so in order to correct optical crosstalk effectively, it is desirable to perform the optical crosstalk correction on the basis of image data having gradation values corresponding to the gradation levels of the image light displayed by the display unit. In the response speed improvement correction process, as shown in FIG. 2(b), the gradation values of the image data are increased or decreased, but the increase or decrease in the gradation values is performed to increase or decrease the drive voltages, and not to increase or decrease the transmittance and the gradation level of the image light. Accordingly, as can be seen from FIGS. 2(a) to 2(c), the gradation values of the image data after the response speed improvement correction process differ from the gradation levels of the image light (transmittance), and the gradation values of the image data before the response speed improvement correction process correspond better to the gradation levels of the image light. Thus, the optical crosstalk correction can be carried out effectively by performing the optical crosstalk correction on the basis of the image data before the response speed improvement correction process.

In the above description, a pattern in which sub-pixels constituting the first image alternate with sub-pixels constituting the second image at intervals of one sub-pixel in the horizontal and vertical directions is taken as an example, but sub-pixels constituting the first image and sub-pixels constituting the second image may alternate in other patterns. For example, sub-pixels constituting the first image may alternate with sub-pixels constituting the second image at intervals of one sub-pixel in only one direction, either the horizontal direction or the vertical direction, and sub-pixels constituting the same image may be aligned in the other direction. That is, the sub-pixel array of the image data G and the parallax barrier structure of the display 4 are not limited to a checkerboard pattern; they may have a striped pattern or other patterns. The sub-pixel array pattern is also not limited to alternation at intervals of one sub-pixel: for example, the images may alternate in groups of two sub-pixels, or a set of three sub-pixels in the first image may alternate with one sub-pixel in the second image.

In the above description, a case in which one pixel consists of a group of sub-pixels of three colors (R, G, B) is taken as an example, but one pixel may consist of sub-pixels of one, two, or four or more colors. For example, one pixel may consist of four sub-pixels with the four colors RGBY (Y: yellow). In this case, the RGBY sub-pixels constituting the first and second images are arrayed as in, for example, the following pattern 1 or 2.

(Pattern 1)
Sub-pixel colors: RGBYGRYBRGBYGRYB
Image formed by sub-pixels: 1212121212121212
(Pattern 2)
Sub-pixel colors: RGBYRGBYRGBYRGBY
Image formed by sub-pixels: 1212212112122121

In the above description, a case in which two images are displayed in different directions is taken as a main example, but three or more images may be displayed in different directions. That is, the image data to be corrected may be a combination of three or more images, and sub-pixels occurring in other images may intervene in the structure in which the sub-pixels constituting the first image alternate with the sub-pixels constituting the second image.

In the above description, a configuration using a liquid crystal panel is taken as an example, but the image processing device in this embodiment is also applicable to other types of electro-optic devices, such as organic EL (electroluminescence) devices and plasma displays.

With respect to crosstalk correction in the above description, a configuration for correcting both electrical and optical crosstalk is shown as an example, but a configuration that corrects only one type of crosstalk is possible. In one aspect, the crosstalk correction processor performs only an optical crosstalk correction process.

In the above description, a configuration in which the optical crosstalk correction is based on the gradation values of sub-pixels included in the adjacent pixels and the gradation values of sub-pixels included in the surrounding pixels is taken as an example, but another configuration is possible in which the correction is based on the gradation values of sub-pixels included in the adjacent pixels but the gradation values of sub-pixels included in the surrounding pixels are not used. This configuration can make optical crosstalk due to adjacent pixels less perceptible. Yet another configuration is possible in which the correction is based on the gradation values of the sub-pixels included in the surrounding pixels and the gradation values of the sub-pixels included in the adjacent pixels are not used. This configuration can make optical crosstalk due to surrounding pixels less perceptible.

The crosstalk correction processor 2 may perform corrections smaller than the changes of one gradation level that can be expressed by the display 4. For example, the correction values in the LUT of the crosstalk correction processor 2 may include a component less than the single gradation level that can be expressed by the display 4 or the image data. In this case, a gradation converter is provided in a stage following the crosstalk correction processor 2. The gradation converter performs, on the image data after the crosstalk correction process, a gradation conversion process that makes perceptible on the display 4 corrections, made by the crosstalk correction processor 2, that are smaller than one gradation level of the display 4. That is, the gradation converter converts the number of gradations of the image data after the crosstalk correction process to conform to the number of gradations of the display 4. Exemplary gradation conversion processes include dithering, error diffusion, and other processes. Similarly, the response speed improvement correction processor 3 may perform corrections smaller than the changes of one gradation level that can be expressed by the display 4. For example, the correction values in a LUT in the response speed improvement correction processor 3 may include a component less than the single gradation level that can be expressed by the display 4 or the image data. In this case, a gradation converter is provided in a stage following the response speed improvement correction processor 3. This gradation converter is similar to the one provided for the crosstalk correction processor 2.

With respect to crosstalk correction, a structure using a total of sixteen LUTs is shown as an example in the above description, but the number of LUTs may be altered as necessary; for example, from the viewpoint of reducing the capacity used up by the LUTs, the number of the LUTs may be reduced as indicated in the following items (1) to (6).

(1) For electrical crosstalk, one LUT may be shared by the two sub-pixels in the up and down directions or the two sub-pixels in the left and right directions. This can reduce the number of electrical crosstalk correction LUTs from four to two.

(2) Experimentally, it is found that electrical crosstalk has a particularly large effect in the source line direction, this effect having about two to three times the magnitude of the effect in the gate line direction. Accordingly, correction may be carried out using only the LUTs corresponding to the left and right sub-pixels, which have the major effect. This can reduce the number of electrical crosstalk correction LUTs from four to two, and if one LUT is shared by the two (left and right) sub-pixels, the number can be reduced further to one.

(3) The electrical crosstalk effect of adjacent sub-pixels on the downstream side in the image scanning direction tends to be greater. Accordingly, when the image is scanned from top left to bottom right, only the LUTs corresponding to the sub-pixels adjacent in the right direction (in the source line direction) and below (in the gate line direction) may be used. This can reduce the number of electrical crosstalk correction LUTs from four to two.

(4) For optical crosstalk, in the sub-pixel selector 121, the average value of the gradation values of the green sub-pixels with coordinates (x−1, y−2) and coordinates (x−2, y−1) located toward the upper left from the green sub-pixel with coordinates (x, y) in FIG. 10 may be obtained and used with one LUT. That is, it is possible to use one LUT that receives input of the combination of this average value and the gradation value of the sub-pixel to be corrected. Similarly, in the upper right, lower left, and lower right directions, one LUT may be used for two sub-pixels. By using one LUT for the average value of the gradation values of two sub-pixels in these diagonal directions as above, the number of optical crosstalk correction LUTs can be reduced from 12 to 8.

(5) For optical crosstalk, in the sub-pixel selector 121, the gradation values of the green sub-pixels located to the left, the upper left, and the lower left of the green sub-pixel with coordinates (x, y) in FIG. 10, having coordinates (x−1, y), (x−2, y−1), and (x−2, y+1), may be weighted according to their distance from coordinates (x, y), and one LUT may be applied to their weighted sum. By similarly applying one LUT to the weighted sum of three sub-pixels in the up, down, and right directions, the number of optical crosstalk correction LUTs can be reduced from 12 to 4. In addition, if the effect of optical crosstalk from sub-pixels located in the left and right directions is assumed to be greater than that from sub-pixels located in the up and down directions, the LUTs for the up and down directions may be omitted to further halve the number of the LUTs to 2.

(6) With a checkerboard pattern parallax barrier structure, since sub-pixels of identical color that are presented in the same direction are located nearest to each other in the diagonal directions as shown in FIG. 10, resolution is higher in the diagonal directions. This higher diagonal resolution means that the diagonal directions appear sharper to the viewer, and because they appear sharper, crosstalk effects are also more perceptible. Accordingly, when the resolution in the diagonal directions is higher, for the purpose of focusing on optical crosstalk correction in the diagonal directions, as the sub-pixels having crosstalk effects (i.e., the sub-pixels used for the correction), only the sub-pixels (eight in total) of the same color that are located in the diagonal directions and included in the surrounding pixels may be used. In this case, in addition, the average value of the gradation values of the green sub-pixels with coordinates (x−1, y−2) and coordinates (x−2, y−1), located in the upper left direction from the green sub-pixel with coordinates (x, y), may be obtained, and one LUT may be applied to this average value. By performing similar processing for the upper right, lower left, and lower right directions, the number of optical crosstalk correction LUTs can be reduced to 4.

In addition, LUTs may be used as described in the following items (7) and (8).

(7) When sub-pixels having crosstalk effects are selected by the sub-pixel selector 121 and the gradation values of the selected sub-pixels are input to the individual LUTs together with the gradation value of the sub-pixel to be corrected, these values may be input to different LUTs according to the direction in which the sub-pixel to be corrected is presented. That is, different LUTs may be used depending on the direction in which the sub-pixel to be corrected is presented.

Directional image display devices sometimes bias the presentation direction due to production problems or product specifications. In this case, by changing the LUT to be used depending on the direction in which the sub-pixel to be corrected is presented as described above, corrections suited to the direction can be made.

(8) Even with the same LUT, the sub-pixels whose gradation values are input to the LUT may change depending on the direction in which the sub-pixel to be corrected is presented. Specifically, with respect to a certain LUT, when a sub-pixel presented in the left direction is corrected, the gradation value of the sub-pixel adjacent on the right may be input, and when a sub-pixel presented in the right direction is corrected, the gradation value of the sub-pixel adjacent on the left may be input.

For example, for optical crosstalk due to reflection, the positions of the sub-pixels that have a crosstalk effect on the sub-pixel to be corrected and are presented in the opposite direction may reverse depending on the screen viewing direction of the viewer. By changing the sub-pixels with gradation values input to the LUT depending on the direction in which the sub-pixel to be corrected is presented as described above, a correction can be made that takes account of differences in the state of occurrence of crosstalk according to the viewing direction.

Second Embodiment

Figure 14:
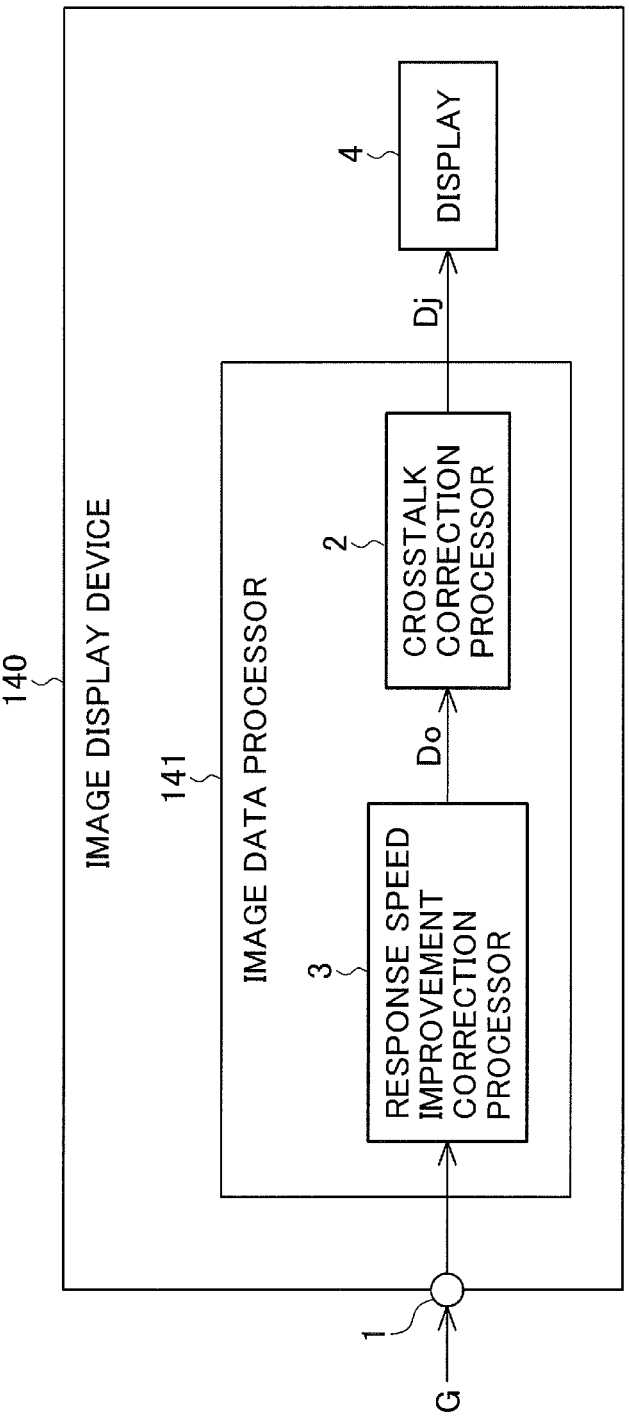
FIG. 14 is a block diagram showing the configuration of the image display device in a second embodiment.

FIG. 14 is a block diagram schematically showing the configuration of the image display device 140 in the second embodiment. The image display device 140 in this embodiment differs from the device in the first embodiment in regard to the correction processing sequence but otherwise is substantially the same. Descriptions of elements that are the same as in the first embodiment will be omitted or simplified in the description below, and the same reference characters will be used.

In the second embodiment, the response speed improvement correction processor 3 performs a response speed improvement correction process based on the image data G to be corrected; then the crosstalk correction processor 2 performs a crosstalk correction process based on the image data Do as corrected by the response speed improvement correction processor 3. Specifically, in the image data processor 141, the crosstalk correction processor 2 is positioned following the response speed improvement correction processor 3. The image data processor 141 performs a correction process on the image data G input to the input terminal 1 by using the response speed improvement correction processor 3 to generate corrected image data Do. Next, the image data processor 141 performs a correction process on the image data Do by using the crosstalk correction processor 2, and outputs corrected image data Dj. The content of the processing in the response speed improvement correction processor 3 and the crosstalk correction processor 2 is the same as in the first embodiment.

Figure 15:
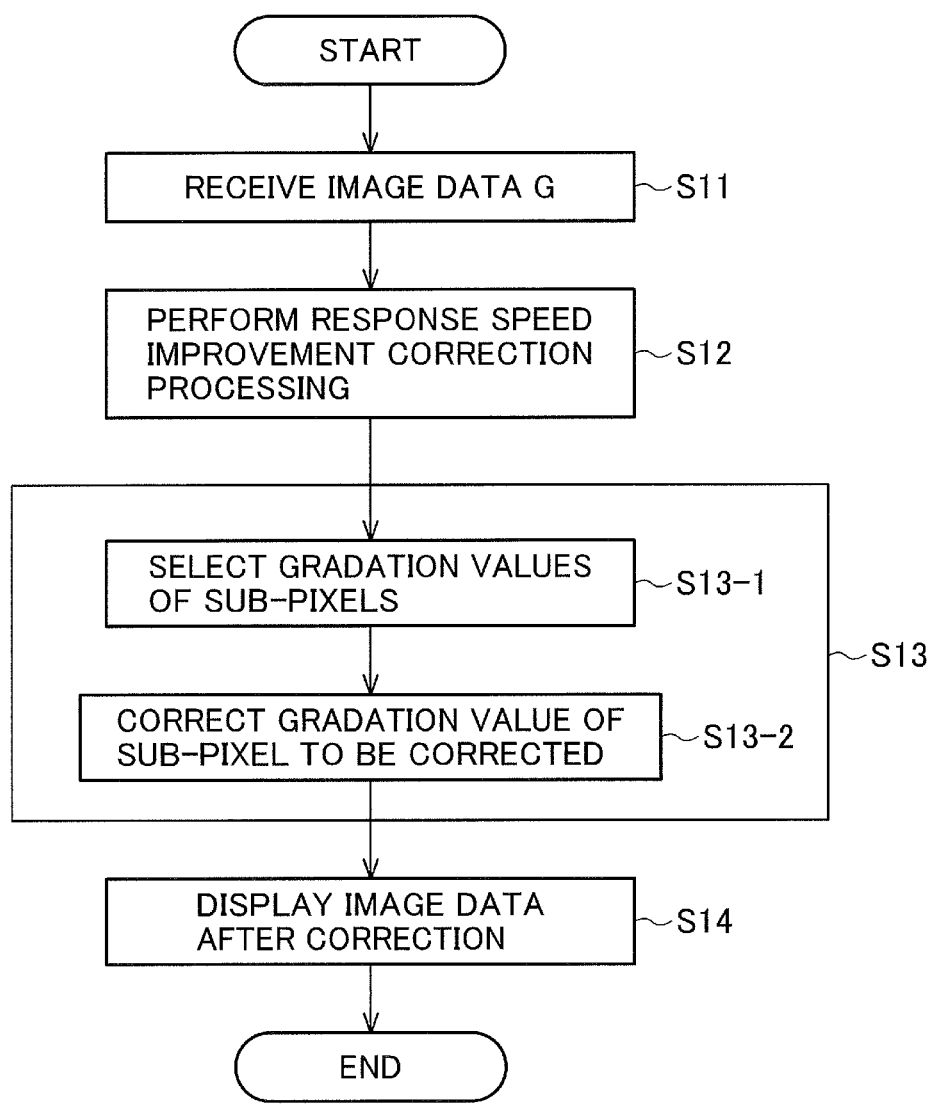
FIG. 15 is a flowchart illustrating the operation of the image display device in the second embodiment.

FIG. 15 is a flowchart illustrating the operation of the image display device 140 in the second embodiment. An example of the operation of the image display device 140 will be described below with reference to FIG. 15.

The image display device 140 receives image data G representing a combined image including multiple images that are displayed in different directions from the same display screen of the display 4 (S11).

Next, the image display device 140 performs a response speed improvement correction process on the image data G (S12).

Then the image display device 140 performs electrical crosstalk and optical crosstalk corrections on the image data as corrected in step S12 (S13).

Step S13 includes steps S13-1 and S13-2.

In step S13-1, the image display device 140 selects, from the image data Do, the gradation value of the sub-pixel to be corrected and the gradation values of the sub-pixels having crosstalk effects on the sub-pixel to be corrected (i.e., the gradation values of the sub-pixels used for the correction).

In step S13-2, on the basis of the gradation values of the sub-pixels selected in step S13-1 as having crosstalk effects, the image display device 140 corrects the gradation value of the sub-pixel to be corrected that was selected in step S13-1.

The image display device 140 then displays the image data as corrected in step S13 (S14). Specifically, the image display device 140 displays multiple images in different directions based on the corrected image data.

As described above, in this embodiment, the image processing device performs a response speed improvement correction process based on the image data (input image data) to be corrected, and then, on the basis of the image data after the response speed improvement correction process, performs a crosstalk correction process. Therefore, this embodiment can make crosstalk effects less perceptible, and can also provide a capability to handle fast-changing moving pictures. Since the crosstalk correction process is performed by use of the image data after the response speed improvement correction process, more effective electrical crosstalk correction can be carried out. Specifically, experiments have shown that electrical crosstalk can be corrected more successfully when the electrical crosstalk correction is performed by use of the image data after the response speed improvement correction process than when the electrical crosstalk correction is performed by using the image data (input image data) before the response speed improvement correction processing. This is thought to be true for the following reason.

Figure 16A:
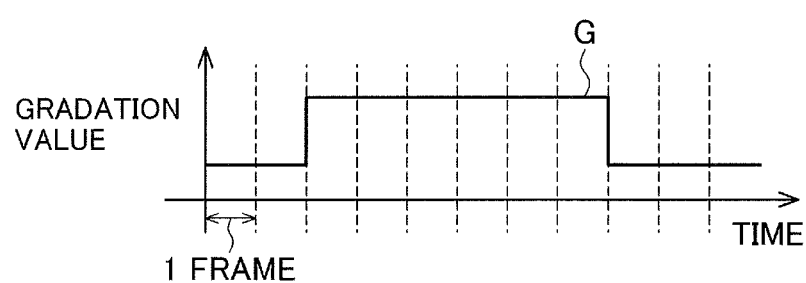
FIGS. 16(a) and 16(b) illustrate the correction process performed in the response speed improvement correction processor in the second embodiment.
Figure 16B:
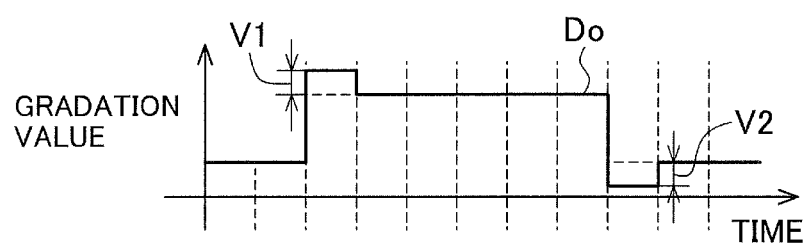

FIGS. 16(*a*) and 16(*b*) are graphs showing how the image data G input to the input terminal 1 are corrected by the response speed improvement correction processor 3. FIG. 16(*a*) indicates the temporal change in the gradation value in the image data G; FIG. 16(*b*) indicates the temporal change in the gradation value in the corrected image data Do. As shown in FIGS. 16(*a*) and 16(*b*), when the gradation value in the image data G increases or decreases, a correction V1 or V2 is added to or subtracted from the gradation value in the image data G to generate corrected image data Do.

Electrical crosstalk occurs, as described in the first embodiment, when an electrical signal for a certain sub-pixel electrically affects the adjacent sub-pixels. Specifically, electrical crosstalk is produced by the liquid crystal drive voltages applied to the liquid crystal of the display 4. Accordingly, for effective electrical crosstalk correction, it is desirable to perform the electrical crosstalk correction on the basis of image data having gradation values corresponding to the liquid crystal drive voltage levels (or the electrical signal levels). In the response speed improvement correction process, gradation values in the image data are increased or decreased as shown in FIG. 16(*b*), and these increases or decreases in gradation value increase or decrease the liquid crystal drive voltage. Accordingly, the gradation values of the image data Do after the response speed improvement correction process correspond more closely to the liquid crystal drive voltage levels than do the gradation values of the image data G before the response speed improvement correction process. Therefore, electrical crosstalk corrections can be made more effectively when they are based on the image data after the response speed improvement correction process.

This can also be thought of as follows. When the gradation value of a sub-pixel in the image data is increased or decreased by the response speed improvement correction process, the liquid crystal drive voltage applied based on the corrected gradation value increases or decreases. This increase or decrease in the liquid crystal drive voltage electrically affects the sub-pixels adjacent to the sub-pixel, producing electrical crosstalk. A configuration in which the crosstalk correction process is performed on the basis of the image data after the response speed improvement correction process enables the electrical crosstalk produced by the response speed improvement correction process to be corrected. That is, an electrical crosstalk correction can be performed for the increase or decrease in the liquid crystal drive voltage due to the increase or decrease in the gradation value occurring in the response speed improvement correction process, whereby electrical crosstalk can be aptly corrected.

Third Embodiment

Figure 17:
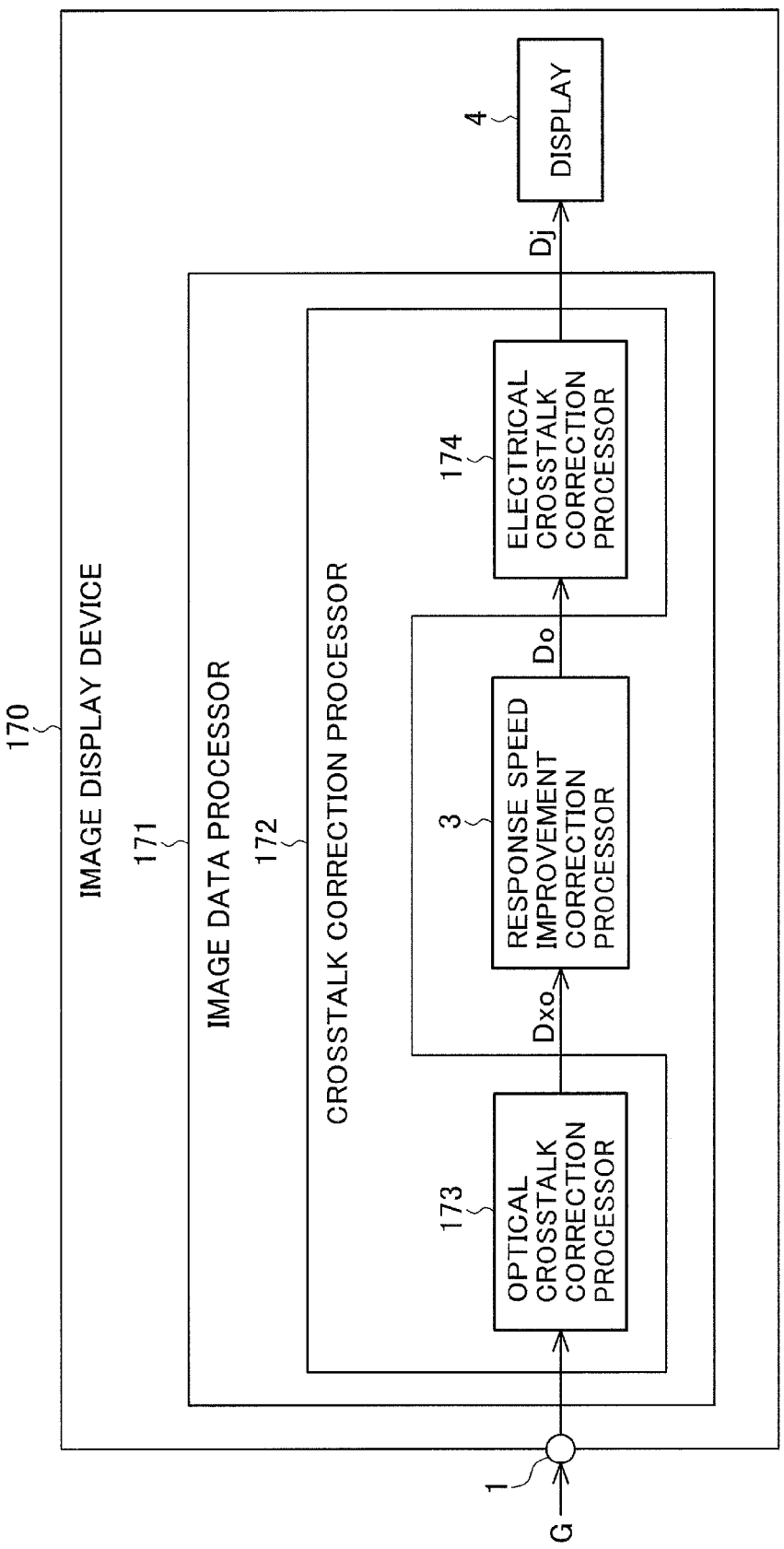
FIG. 17 is a block diagram showing the configuration of the image display device in a third embodiment.

FIG. 17 is a block diagram schematically showing the configuration of the image display device 170 in the third embodiment. The image display device 170 in this embodiment differs from the devices in the first and second embodiments in regard to the correction processing sequence but otherwise is substantially the same. Descriptions of elements that are the same as in the first or second embodiment will be omitted or simplified in the description below, and the same reference characters will be used.

In the third embodiment, the crosstalk correction processor 172 includes an optical crosstalk correction processor 173 for performing an optical crosstalk correction process and an electrical crosstalk correction processor 174 for performing an electrical crosstalk correction process. The optical crosstalk correction processor 173 performs an optical crosstalk correction process based on the image data G to be corrected, the response speed improvement correction processor 3 performs a response speed improvement correction process based on the image data Dxo as corrected by the optical crosstalk correction processor 173, and the electrical crosstalk correction processor 174 performs an electrical crosstalk correction process based on the image data Do as corrected by the response speed improvement correction processor 3. Specifically, in the image data processor 171, the response speed improvement correction processor 3 is positioned following the optical crosstalk correction processor 173, and the electrical crosstalk correction processor 174 is positioned following the response speed improvement correction processor 3. The image data processor 171 performs an optical crosstalk correction process on the image data G input to the input terminal 1 by using the optical crosstalk correction processor 173 to generate corrected image data Dxo. Next, the image data processor 171 performs a response speed improvement correction process on the image data Dxo by using the response speed improvement correction processor 3 to generate corrected image data Do. Then the image data processor 171 performs an electrical crosstalk correction process on the image data Do by using the electrical crosstalk correction processor 174 and outputs corrected image data Dj. The response speed improvement correction processor 3 is the same as in the first or second embodiment.

Figure 18:
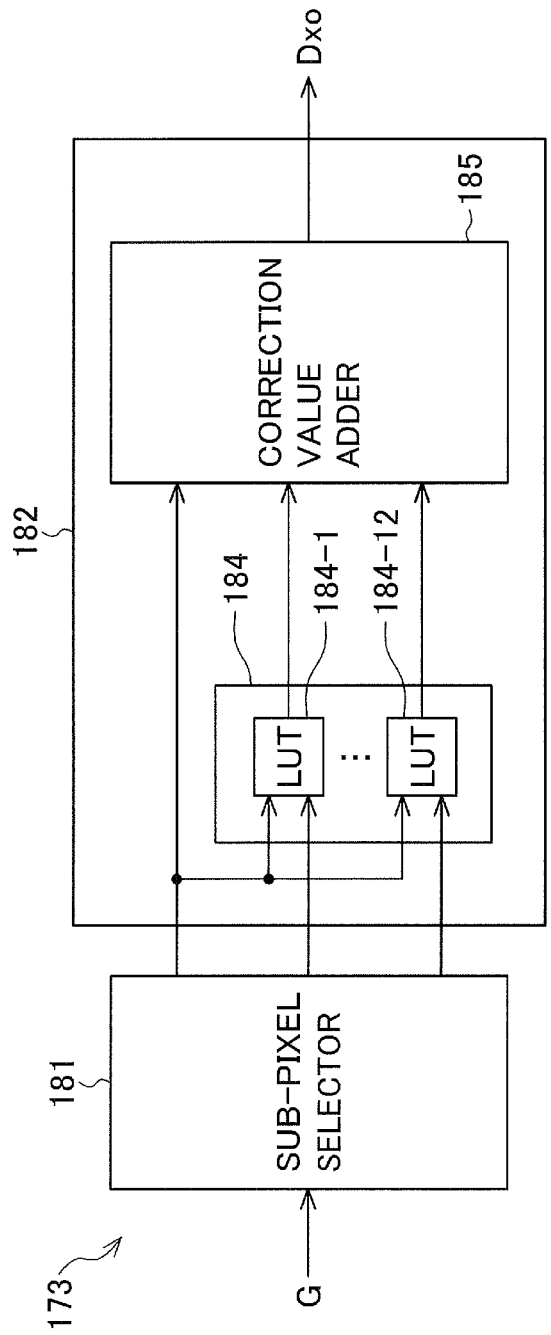
FIG. 18 is a block diagram showing an exemplary configuration of the optical crosstalk correction processor in the third embodiment.

FIG. 18 is a block diagram showing an exemplary configuration of the optical crosstalk correction processor 173. The configuration of the optical crosstalk correction processor 173 will be described below with reference to FIG. 18. The optical crosstalk correction processor 173 in FIG. 18 includes a sub-pixel selector 181 and a corrector 182.

The sub-pixel selector 181 receives the image data G and selects the gradation value of a sub-pixel to be corrected and the gradation values of sub-pixels having optical crosstalk effects on the sub-pixel to be corrected (i.e., the gradation values of the sub-pixels used for the correction) from the image data G. Specifically, the sub-pixel selector 181 selects, as the gradation values of the sub-pixels having crosstalk effects, the gradation values of sub-pixels with the same color as the sub-pixel to be corrected included in the pixels adjacent to the pixel in which the sub-pixel to be corrected is included and in the pixels surrounding the adjacent pixels, that belong to the image differing from the image to which the sub-pixel to be corrected belongs. For example, when the right green sub-pixel with coordinates (x, y) in FIG. 7 is corrected, the sub-pixel selector 181 selects the gradation values of a total of twelve sub-pixels having the same green color as the sub-pixel to be corrected, shown in FIG. 10, that are included in the adjacent pixels and surrounding pixels with respect to the pixel with coordinates (x, y) and are displayed in the left direction, differing from the display direction of the sub-pixel to be corrected.

The corrector 182 corrects the gradation value of the sub-pixel to be corrected that was selected by the sub-pixel selector 181, according to the gradation values of the sub-pixels having optical crosstalk effects that were selected by the sub-pixel selector 181.

The corrector 182 includes an optical crosstalk correction value generator 184 and a correction value adder 185.

The optical crosstalk correction value generator 184 generates correction values for correcting optical crosstalk on the basis of the gradation value of the sub-pixel to be corrected and the gradation values of the sub-pixels having optical crosstalk effects on that sub-pixel.

The correction value adder 185 adds the correction values generated by the optical crosstalk correction value generator 184 to the gradation value of the sub-pixel to be corrected, and outputs the gradation value, corrected for optical crosstalk, of the sub-pixel to be corrected.

In the example in FIG. 18, the optical crosstalk correction value generator 184 includes a total of twelve optical crosstalk correction LUTs 184-1 to 184-12 corresponding to the total of twelve sub-pixels having optical crosstalk effects, shown in FIG. 10. Each of the twelve optical crosstalk correction LUTs 184-1 to 184-12 converts the combination of the gradation value of the sub-pixel to be corrected and the gradation value of the sub-pixel corresponding to the LUT to a correction value and outputs the correction value to the correction value adder 185.

The correction value adder 185 adds the total of twelve correction values output from the twelve optical crosstalk correction LUTs 184-1 to 184-12 to the gradation value of the sub-pixel to be corrected, and outputs the gradation value after the optical crosstalk correction.

In the above description, a case in which a green sub-pixel is corrected is taken as an example, but corrections for sub-pixels of other colors are performed in the same way.

Figure 19:
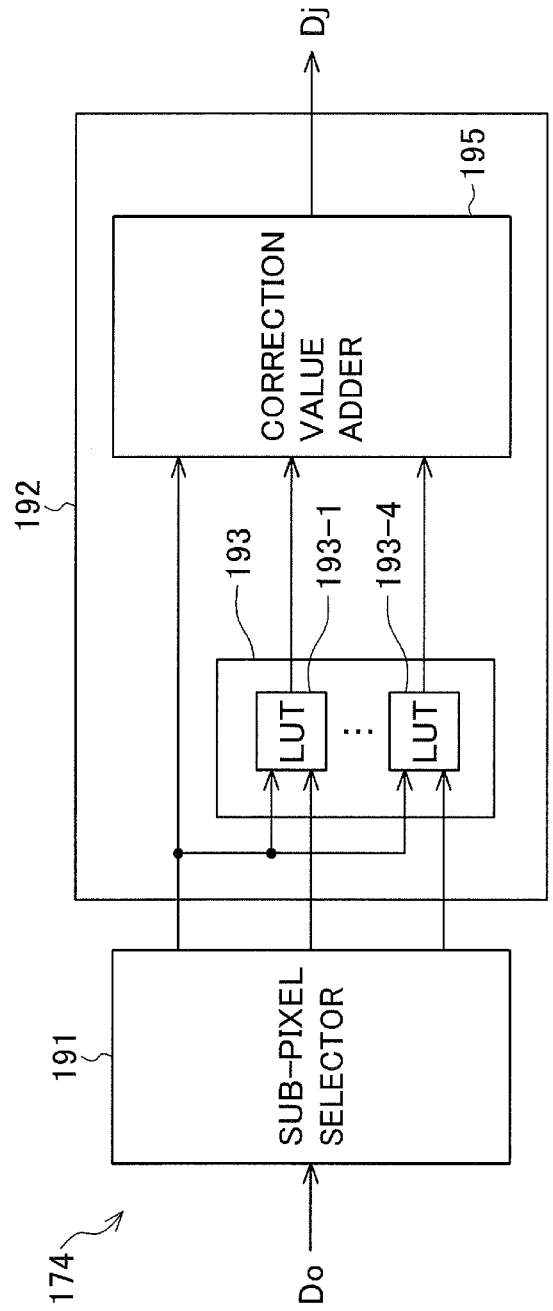
FIG. 19 is a block diagram showing an exemplary configuration of the electrical crosstalk correction processor in the third embodiment.

FIG. 19 is a bock diagram showing an exemplary configuration of the electrical crosstalk correction processor 174. The configuration of the electrical crosstalk correction processor 174 will be described below with reference to FIG. 19. The electrical crosstalk correction processor 174 in FIG. 19 includes a sub-pixel selector 191 and a corrector 192.

The sub-pixel selector 191 receives the image data Do and selects, from image data Do, the gradation value of a sub-pixel to be corrected and the gradation values of the sub-pixels having electrical crosswalk effects on the sub-pixel to be corrected (i.e., the gradation values of the sub-pixels used for the correction). Specifically, as the gradation values of the sub-pixels having electrical crosstalk effects, the sub-pixel selector 191 selects the gradation values of a total of four sub-pixels adjacent (up, down, left, right) to the sub-pixel to be corrected.

The corrector 192 corrects the gradation value of the sub-pixel to be corrected that was selected by the sub-pixel selector 191, according to the gradation values of the sub-pixels selected by the sub-pixel selector 191 as having electrical crosstalk effects.

The corrector 192 includes an electrical crosstalk correction value generator 193 and a correction value adder 195.

The electrical crosstalk correction value generator 193 generates correction values for correcting electrical crosstalk on the basis of the gradation value of the sub-pixel to be corrected and the gradation values of the sub-pixels having electrical crosstalk effects on the sub-pixel to be corrected.

The correction value adder 195 adds the correction values generated by the electrical crosstalk correction value generator 193 to the gradation value of the sub-pixel to be corrected, and outputs the gradation value, corrected for electrical crosstalk, of the sub-pixel to be corrected.

In the example in FIG. 19, the electrical crosstalk correction value generator 193 includes a total of four electrical crosstalk correction LUTs 193-1 to 193-4 corresponding to a total of four sub-pixels adjacent (up, down, left, right) to the sub-pixel to be corrected. Each of the four electrical crosstalk correction LUTs 193-1 to 193-4 converts the combination of the gradation value of the sub-pixel to be corrected and the gradation value of the sub-pixel corresponding to the LUT to a correction value and outputs the correction value to the correction value adder 195.

The correction value adder 195 adds the total of four correction values output from the four electrical crosstalk correction LUTs 193-1 to 193-4 to the gradation value of the sub-pixel to be corrected, and outputs the gradation value after the electrical crosstalk correction.

In the above description, a case in which a green sub-pixel is corrected is taken as an example, but corrections for sub-pixels of other colors are performed in the same way.

Figure 20:
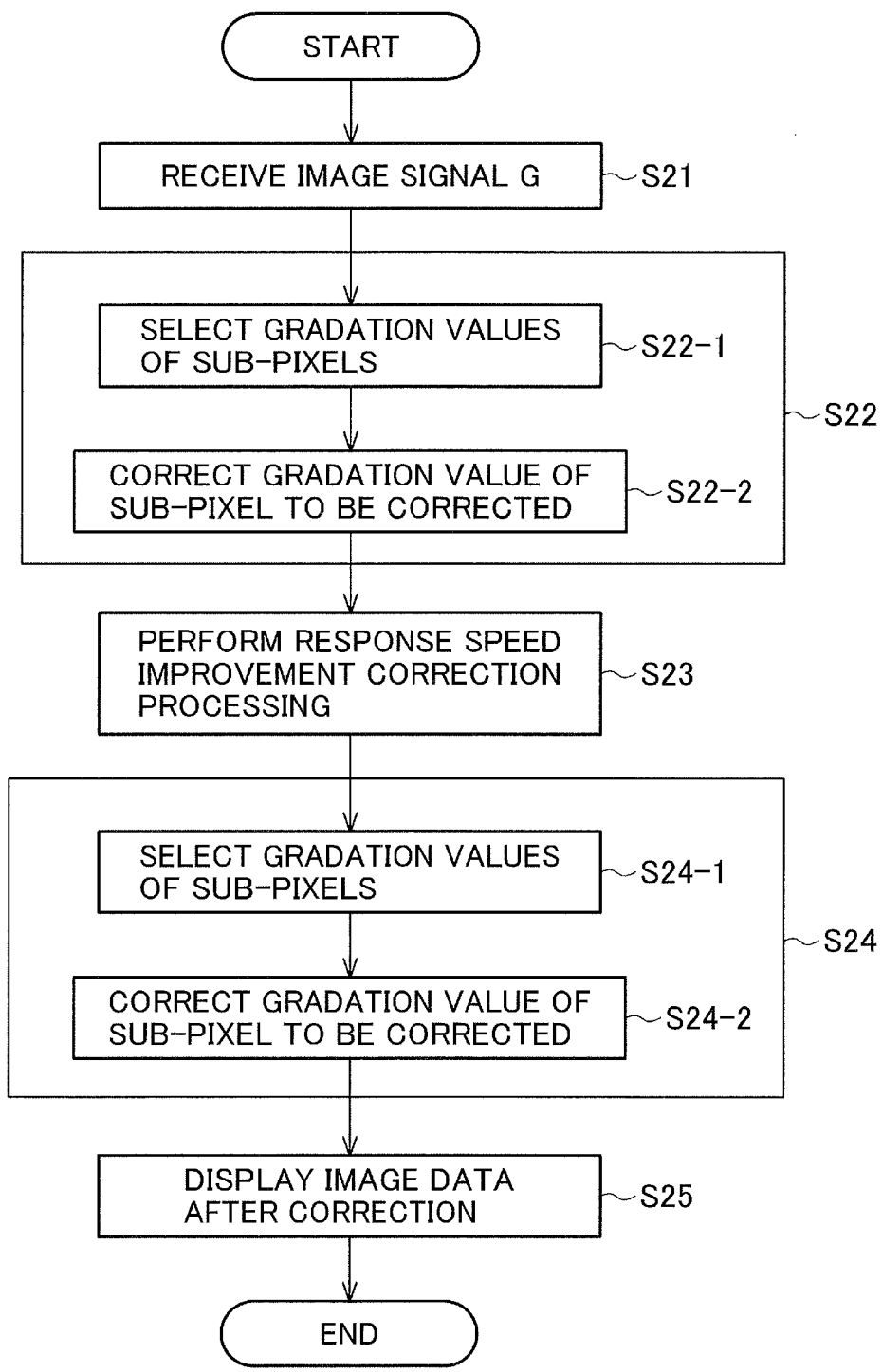
FIG. 20 is a flowchart illustrating the operation of the image display device in the third embodiment.

FIG. 20 is a flowchart illustrating the operation of the image display device 170 in the third embodiment. An example of the operation of the image display device 170 will be described below with reference to FIG. 20.

The image display device 170 receives image data G representing a combined image including multiple images that are displayed in different directions from the same display screen of the display 4 (S21).

Next, the image display device 170 performs an optical crosstalk correction process on the image data G (S22).

The above step S22 includes steps S22-1 and S22-2.

In step S22-1, the image display device 170 selects from the image data G the gradation value of the sub-pixel to be corrected and the gradation values of the sub-pixels having optical crosstalk effects on the sub-pixel to be corrected (i.e., the gradation values of the sub-pixels used for the correction).

In step S22-2, on the basis of the gradation values of the sub-pixels selected in step S22-1 as having optical crosstalk effects, the image display device 170 corrects the gradation value of the sub-pixel to be corrected that was selected in step S22-1.

The image display device 170 then performs a response speed improvement correction process on the image data Dxo as corrected in step S22 (S23).

Next, the image display device 170 performs an electrical crosstalk correction process on the image data Do as corrected in step S23 (S24).

The above step S24 includes steps S24-1 and S24-2.

In step S24-1, the image display device 170 selects from the image data Do the gradation value of the sub-pixel to be corrected and the gradation values of the sub-pixels having electrical crosstalk effects on the pixel to be corrected (i.e., the gradation values of the sub-pixels used for the correction).

In step S24-2, on the basis of the gradation values of the sub-pixels selected in step S24-1 as having electrical crosstalk effects, the image display device 170 corrects the gradation value of the sub-pixel to be corrected that was selected in step S24-1.

The image display device 170 then displays the image data as corrected in step S24 (S25). Specifically, on the basis of the image data after the correction, the image display device 170 displays multiple images in different directions.

As described above, in this embodiment, the image processing device performs an optical crosstalk correction process based on the image data (input image data) to be corrected; then, based on the image data after the optical crosstalk correction process, performs a response speed improvement correction process; and then, based on the image data after the response speed improvement correction process, performs an electrical crosstalk correction process. Accordingly, this embodiment can make crosstalk effects less perceptible, and can also provide a capability to handle fast-changing moving pictures. Since the optical crosstalk correction process is performed by use of the image data before the response speed improvement correction process, optical crosstalk correction can be performed more effectively, and since the electrical crosstalk correction process is performed by use of the image data after the response speed improvement correction processing, electrical crosstalk correction can be performed more effectively.

Fourth Embodiment

Figure 21:
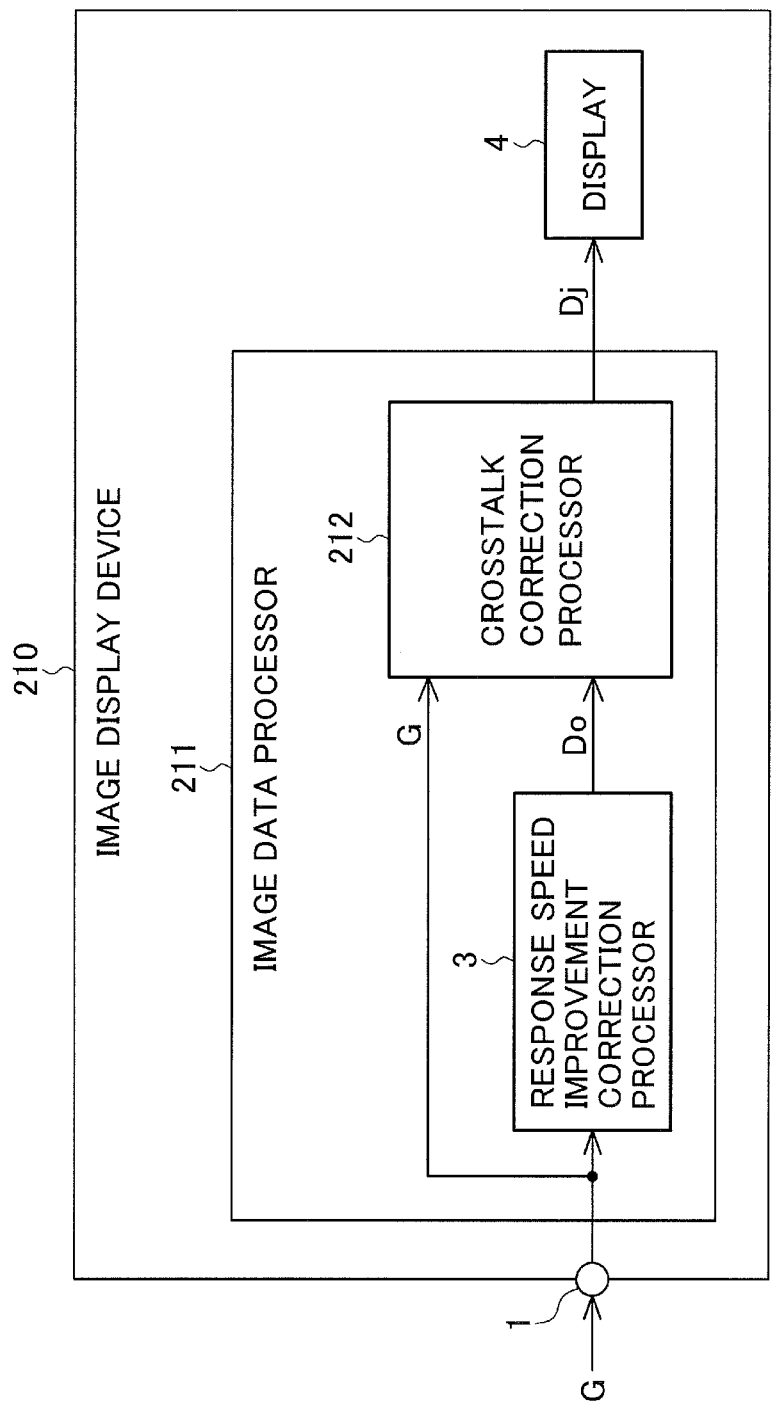
FIG. 21 is a block diagram showing the configuration of the image display device in a fourth embodiment.

FIG. 21 is a block diagram schematically showing the configuration of the image display device 210 in the fourth embodiment. The image display device 210 in this embodiment differs from the device in the second embodiment in regard to the crosstalk correction but otherwise is substantially the same. Descriptions of elements that are the same as in the first or second embodiment will be omitted or simplified in the description below, and the same reference characters will be used.

The crosstalk correction processor 212 in the fourth embodiment generates optical crosstalk correction values for correcting optical crosstalk on the basis of the image data G to be corrected, generates electrical crosstalk correction values for correcting electrical crosstalk on the basis of the image data Do as corrected by the response speed improvement correction processor 3, and by using the optical crosstalk correction values and electrical crosstalk correction values, performs an optical crosstalk correction process and an electrical crosstalk correction process on the image data Do as corrected by the response speed improvement correction processor 3. Specifically, the image data processor 211 uses the response speed improvement correction processor 3 to perform a response speed improvement correction process on the image data G input to the input terminal 1, thereby generating the corrected image data Do. Next, the image data processor 211 uses the crosstalk correction processor 212 to perform optical and electrical crosstalk correction processes on the image data Do and outputs the corrected image data Dj. In these processes, the crosstalk correction processor 212 generates optical crosstalk correction values based on the image data G to be corrected, generates electrical crosstalk correction values based on the corrected image data Do as corrected by the response speed improvement correction processor 3, and uses the optical crosstalk correction values and electrical crosstalk correction values to perform an optical crosstalk correction process and an electrical crosstalk correction process on the corrected image data Do, thereby outputting the corrected image data Dj. The response speed improvement correction processor 3 is the same as in the first, second, or third embodiment.

Figure 22:
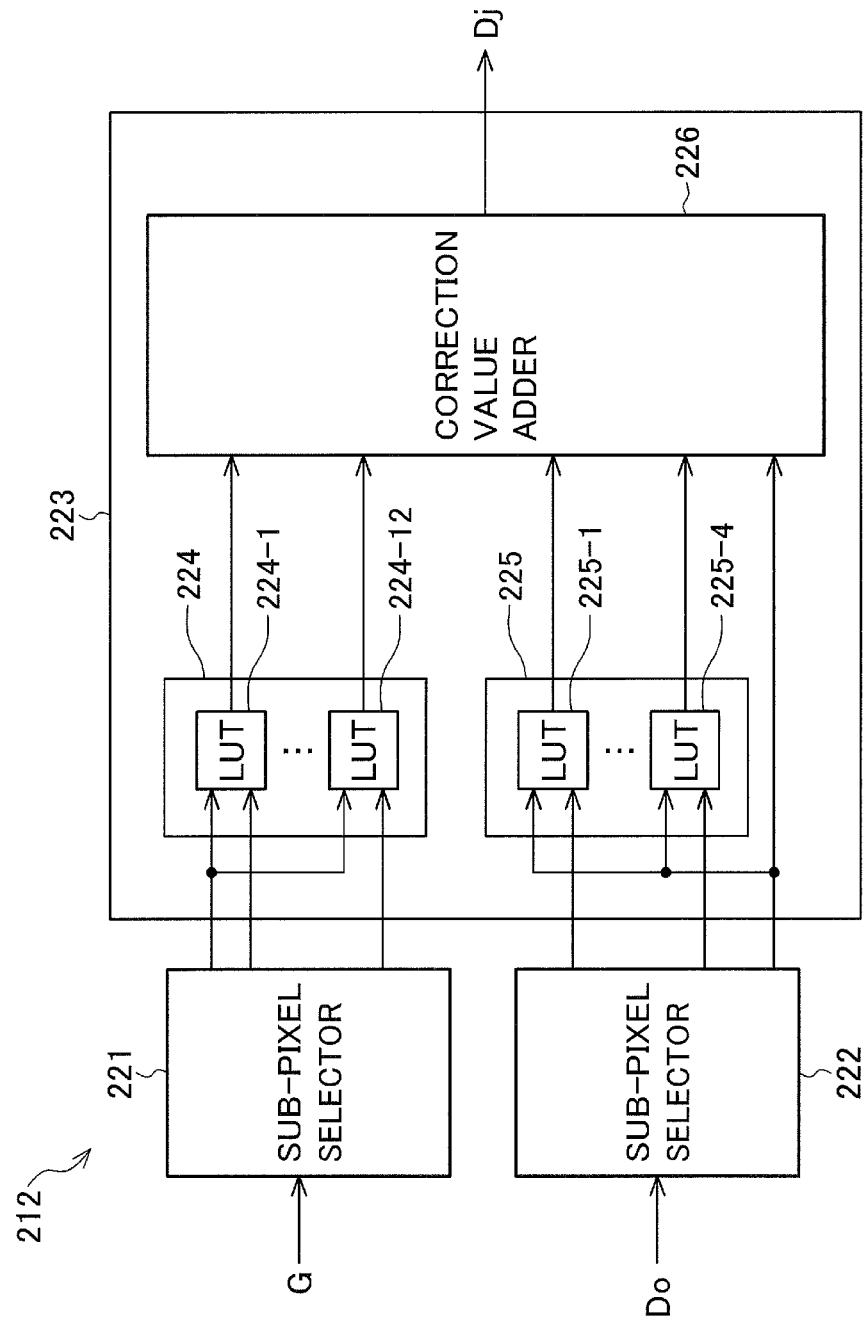
FIG. 22 is a block diagram showing an exemplary configuration of the crosstalk correction processor in the fourth embodiment.

FIG. 22 is a block diagram showing an exemplary configuration of the crosstalk correction processor 212. The configuration of the crosstalk correction processor 212 will be described below with reference to FIG. 22. The crosstalk correction processor 212 in FIG. 22 includes a sub-pixel selector 221 for optical crosstalk correction, a sub-pixel selector 222 for electrical crosstalk correction, and a corrector 223.

The sub-pixel selector 221 for optical crosstalk correction receives the image data G, and selects the gradation value of a sub-pixel to be corrected and the gradation values of sub-pixels having optical crosstalk effects on the sub-pixel to be corrected (i.e., the gradation values of the sub-pixels used for the correction) from the image data G. Specifically, the sub-pixel selector 221 selects, as the gradation values of sub-pixels having crosstalk effects, the gradation values of the sub-pixels with the same color as the sub-pixel to be corrected included among the pixels adjacent to the pixel in which the sub-pixel to be corrected is included and in pixels surrounding the adjacent pixels, and belonging to the image differing from the image to which the sub-pixel to be corrected belongs. For example, when the right green sub-pixel with coordinates (x, y) in FIG. 7 is corrected, the sub-pixel selector 221 selects the gradation values of a total of twelve sub-pixels having the same green color as the sub-pixel to be corrected, shown in FIG. 10, that are included in the adjacent pixels and surrounding pixels with respect to the pixel with coordinates (x, y) and are displayed in the left direction, differing from the display direction of the sub-pixel to be corrected.

The sub-pixel selector 222 for electrical crosstalk correction receives the corrected image data Do as corrected by the response speed improvement correction processor 3 and selects the gradation value of the sub-pixel to be corrected and the gradation values of sub-pixels having electrical crosstalk effects on the sub-pixel to be corrected (i.e., the gradation values of the sub-pixels used for the correction) from the corrected image data Do. Specifically, the sub-pixel selector 222 selects, as the gradation values of the sub-pixels having electrical crosstalk effects, the gradation values of a total of four sub-pixels adjacent (up, down, left, right) to the sub-pixel to be corrected.

The corrector 223 corrects the gradation value of the sub-pixel to be corrected that was selected by the sub-pixel selector 222, according to the gradation values of the sub-pixels selected by the sub-pixel selectors 221 and 222 as having crosstalk effects.

The corrector 223 includes an optical crosstalk correction value generator 224, an electrical crosstalk correction value generator 225, and a correction value adder 226.

The optical crosstalk correction value generator 224 generates correction values for correcting optical crosstalk, based on the gradation value of the sub-pixel to be corrected as selected from the image data G (i.e., the gradation value of the sub-pixel to be corrected in the image data before the response speed improvement correction process) and the gradation values of the sub-pixels having optical crosstalk effects on the sub-pixel to be corrected.

The electrical crosstalk correction value generator 225 generates correction values for correcting electrical crosstalk, based on the gradation value of the sub-pixel to be corrected and the gradation values of the sub-pixels having electrical crosstalk effects on the sub-pixel to be corrected, which are selected from the corrected image data Do after the response speed improvement correction process.

The correction value adder 226 adds the correction values generated by the optical crosstalk correction value generator 224 and the correction values generated by the electrical crosstalk correction value generator 225 to the gradation value of the sub-pixel to be corrected in the corrected image data Do after the response speed improvement correction process, and outputs the gradation value of the sub-pixel to be corrected after the crosstalk correction.

In the example in FIG. 22, the optical crosstalk correction value generator 224 includes a total of twelve optical crosstalk correction LUTs 224-1 to 224-12 corresponding to the total of twelve sub-pixels having optical crosstalk effects, shown in FIG. 10. Each of the twelve optical crosstalk correction LUTs 224-1 to 224-12 converts the combination of the gradation value of the sub-pixel to be corrected and the gradation value of the sub-pixel corresponding to the LUT to a correction value and outputs the correction value to the correction value adder 226.

The electrical crosstalk correction value generator 225 includes a total of four electrical crosstalk correction LUTs 225-1 to 225-4 corresponding to a total of four sub-pixels adjacent (up, down, left, right) to the sub-pixel to be corrected. Each of the four electrical crosstalk correction LUTs 225-1 to 225-4 converts the combination of the gradation value of the sub-pixel to be corrected and the gradation value of the sub-pixel corresponding to the LUT to a correction value and outputs the correction value to the correction value adder 226.

The correction value adder 226 adds the total of twelve correction values output from the twelve optical crosstalk correction LUTs 224-1 to 224-12 and the total of four correction values output from the four electrical crosstalk correction LUTs 225-1 to 225-4 to the gradation value of the sub-pixel to be corrected in the corrected image data Do after the response speed improvement correction process, and outputs the gradation value after the crosstalk correction.

In the above description, a case in which a green sub-pixel is corrected is taken as an example, but corrections for sub-pixels of other colors are performed in the same way.

As described above, in the fourth embodiment, the image processing device generates optical crosstalk correction values based on the image data to be corrected, generates electrical crosstalk correction values based on the image data after the response speed improvement correction process, and by using the optical crosstalk correction values and electrical crosstalk correction values, performs an optical crosstalk correction process and an electrical crosstalk correction process on the image data after the response speed improvement correction process. Therefore, this embodiment can make crosstalk effects less perceptible, as well as providing a capability to handle fast-changing moving pictures. Since the optical crosstalk correction values are generated by use of the image data before the response speed improvement correction process is performed, optical crosstalk correction can be performed more effectively. Since the electrical crosstalk correction values are generated by the use of the image data after the response speed improvement correction process, electrical crosstalk correction can be performed more effectively. In addition, the optical crosstalk correction process and electrical crosstalk correction process can be performed simultaneously, which can simplify the structure of the crosstalk correction processor and reduce its circuit size.

Fifth Embodiment

Figure 23:
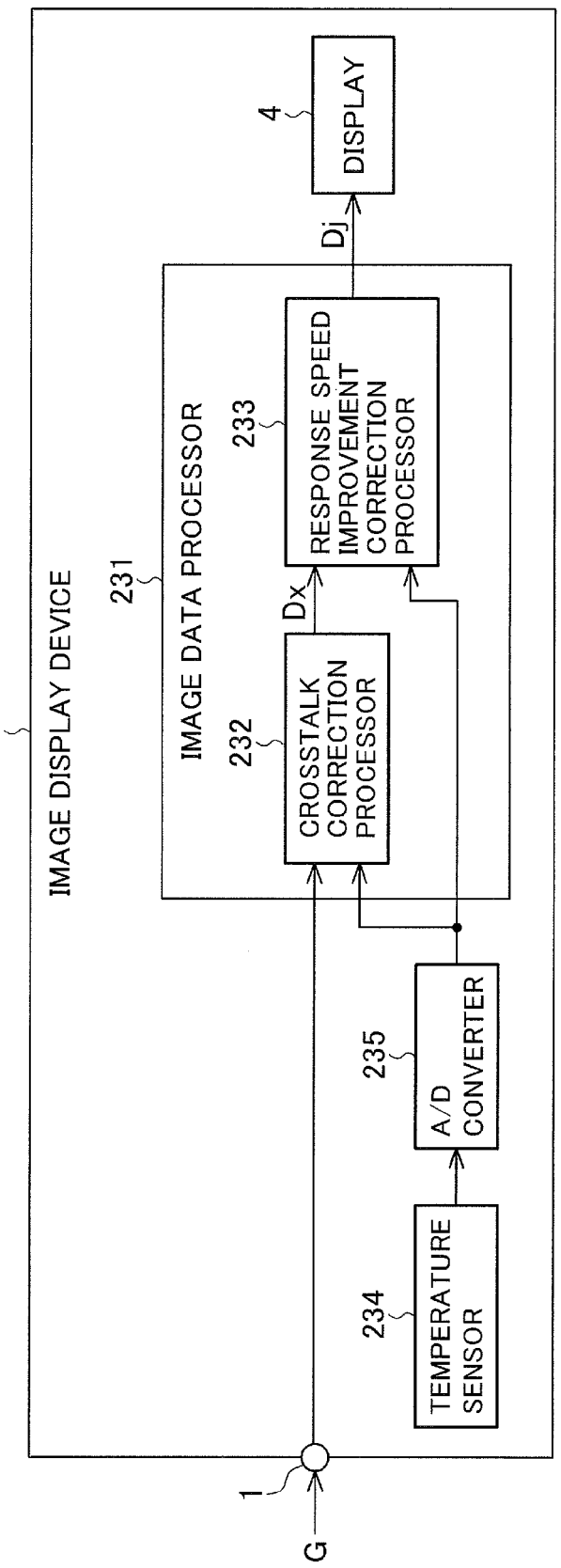
FIG. 23 is a block diagram showing the configuration of the image display device in a fifth embodiment.

FIG. 23 is a block diagram schematically showing the configuration of the image display device 230 in the fifth embodiment. This image display device 230 is substantially the same as the device in the first embodiment, but differs in that the size of the corrections performed in the correction processes is varied depending on the temperature. Descriptions of elements that are the same as in the first embodiment will be omitted or simplified in the description below, and the same reference characters will be used.

The crosstalk correction processor 232 and response speed improvement correction processor 233 in the fifth embodiment alter the sizes of the corrections in the correction processes performed by the crosstalk correction processor 232 and response speed improvement correction processor 233 according to the temperature of the image display device 230 or the ambient temperature around the image display device 230. Specifically, the crosstalk correction processor 232 changes the correction values corresponding to the combinations of sub-pixel gradation values according to the temperature of the image display device 230 or its ambient temperature. The response speed improvement correction processor 233 changes the correction values corresponding to changes of gradation value in the image data to be corrected according to the temperature of the image display device 230 or its ambient temperature.

In the example in FIG. 23, the image display device 230 includes a temperature sensor 234 and an A/D converter 235. The temperature sensor 234 senses the temperature of the image display device 230 or its ambient temperature and outputs an analog signal indicating the temperature to the A/D converter 235. The A/D converter 235 converts the analog signal from the temperature sensor 234 to a digital signal giving temperature information T, and supplies the temperature information T to the crosstalk correction processor 232 and response speed improvement correction processor 233. The crosstalk correction processor 232 changes the size of the crosstalk corrections according to the temperature information T. The response speed improvement correction processor 233 changes the size of the response speed improvement corrections according to the temperature information T.

FIG. 24 is a block diagram showing an exemplary configuration of the crosstalk correction processor 232 in the fifth embodiment. In FIG. 24, the crosstalk correction processor 232 includes a LUT data storage unit 241 and a LUT controller 242.

The LUT data storage unit 241 stores data for changing the correspondence between the sub-pixel gradation values and correction values indicated by each LUT in the crosstalk correction processor 232. Specifically, the LUT data storage unit 241 stores, for each LUT, LUT data (data representing the conversion table showing the correspondence between sub-pixel gradation values and correction values) corresponding to each temperature. The LUT data storage unit 241 is specifically configured from non-volatile storage media such as EEPROM (Electrically Erasable and Programmable Read Only Memory).

The LUT controller 242 receives the temperature information T indicating the temperature of the image display device 230 or its ambient temperature and alters the correspondence between sub-pixel gradation values and correction values indicated by each LUT in the crosstalk correction processor 232 according to the temperature information T. Specifically, for each LUT, the LUT controller 242 reads the LUT data corresponding to the temperature information T from the LUT data storage unit 241 and rewrites the LUT on the basis of the LUT data.

The response speed improvement correction processor 233 alters the LUTs in which changes in gradation value are associated with correction values, by making alterations according to the temperature information T in the same way as the crosstalk correction processor 232. That is, the response speed improvement correction processor 233 includes a LUT data storage unit in which LUT data corresponding to each temperature (data representing a conversion table indicating a correspondence between changes in the sub-pixel gradation values and correction values) are stored, and a LUT controller for reading the LUT data corresponding to the temperature information T from the LUT data storage unit and rewriting the LUTs on the basis of the LUT data.

As described above, in this embodiment, the crosstalk correction processor changes the size of the crosstalk corrections according to the temperature of the image display device or its ambient temperature. This enables appropriate crosstalk corrections to be made, responsive to the temperature of the image display device or its ambient temperature. Specifically, even if the characteristics of the image display device and the occurrence of crosstalk change with temperature, adjustment of the correction values in the crosstalk correction processes according to the temperature information enables the changes to be tracked and accurate crosstalk corrections to be performed. That is, it becomes possible to deal with changes in the occurrence of electrical and optical crosstalk in the same way as temperature-dependent changes in the gamma curve etc. in the image display device, making ghosts due to crosstalk less likely to be perceived.

In this embodiment, the response speed improvement correction processor also changes the size of the response speed improvement correction according to the temperature of the image display device or its ambient temperature. This enables appropriate response speed improvement corrections to be made, responsive to the temperature of the image display device or its ambient temperature. Specifically, even if the characteristics of the image display device and the response characteristic of the display (e.g., the liquid crystal) change with temperature, adjustment of the correction values in the response speed improvement correction process according to the temperature information enables the changes to be tracked and accurate corrections to be performed. That is, it becomes possible to deal with changes in the response characteristic of the display in the same way as temperature-dependent changes in the gamma curve etc. in the image display device, improving the response speed of the display and enabling fast-changing moving pictures to be handled.

In the exemplary configuration described above the LUT controller 242 reads LUT data from the LUT data storage unit 241, but a configuration in which the LUT controller 242 receives LUT data generated by computation in a microprocessor (not shown) in the image display device 230 is also possible. This configuration enables the LUT data storage unit 241 to be omitted.

The exemplary configuration described above deals with temperature changes by updating the LUTs, but in an alternative configuration, the crosstalk correction processor 232 has a plurality of LUTs corresponding to different temperatures: if they include LUTs corresponding to the temperature indicated by the temperature information T, the correction values are obtained from those LUTs; if no LUTs correspond to that temperature, the correction values are obtained by interpolation. For example, the crosstalk correction processor 232 may have a 0° C. LUT and a 30° C. LUT; when the temperature information T indicates 0° C. or 30° C., the correction values are obtained by using the 0° C. LUT or the 30° C. LUT; when the temperature information T indicates a temperature between 0° C. and 30° C. (e.g., 15° C.), the correction values corresponding to that temperature (e.g., 15° C.) are obtained by interpolation from the correction values obtained from the two LUTs.

The exemplary configuration described above alters each LUT in the crosstalk correction processor, but another possible configuration alters only some of the LUTs, such as only the optical crosstalk correction LUTs.

The exemplary configuration described above alters the correction values in the crosstalk correction processor and the response speed improvement correction processor, but another possible configuration alters only some of the correction values in the image data processor, such as only the correction values in the response speed improvement correction processor.

The scheme used in this embodiment, that is, the scheme that changes the size of the corrections according to the temperature, is applicable to the image display device in the second, third, or fourth embodiment.

In the first to fifth embodiments described above, the inventive image processing device is implemented by a crosstalk correction processor and a response speed improvement correction processor. The image processing device may, however, include components other than the crosstalk correction processor or the response speed improvement correction processor in the above image display devices. In one aspect, the functions of the image processing device are implemented by hardware circuitry, but they may also be implemented by a combination of hardware resources and software. Specifically, the functions of the image processing device may be implemented by execution of an image processing program by a computer. More specifically, the functions of the image processing device may be implemented by the reading of an image processing program stored in a ROM (Read Only Memory) or other storage media into a main memory and the execution of the program by a CPU (Central Processing Unit). The image processing program may be stored in and supplied from an optical disc or other computer-readable storage media, or may be supplied through the Internet or other communication lines.

The present invention is not limited to the above embodiments; it can be carried out in various other ways that are within the scope of the invention.

REFERENCE CHARACTERS 1 input terminal, 2, 172, 212, 232 crosstalk correction processor, 3, 233 response speed improvement correction processor, 4 display, 31 backlight, 32, 50, 60 liquid crystal panel, 33, 52, 53, 62 parallax barrier, 51, 61, 63 sub-pixel, 100, 140, 170, 210, 230 image display device, 101, 141, 171, 211, 231 image data processor, 121, 181, 191, 221, 222 sub-pixel selector, 122, 182, 192, 223 corrector, 123, 193, 225 electrical crosstalk correction value generator, 123-1 to 123-4, 193-1 to 193-4, 225-1 to 225-4 electrical crosstalk correction LUT, 124, 184, 224 optical crosstalk correction value generator, 124-1 to 124-12, 184-1 to 184-12, 224-1 to 224-12 optical crosstalk correction LUT, 125, 185, 195, 226 correction value adder, 173 optical crosstalk correction processor, 174 electrical crosstalk correction processor, 234 temperature sensor, 235 A/D converter, 241 LUT data storage unit, 242 LUT controller.

What is claimed is:

1. An image processing device for receiving image data in which multiple images that are displayed in mutually differing directions from a single display screen of a display are combined as input image data, and performing correction processes to output corrected image data,
the image processing device comprising:
a crosstalk correction processor configured to correct crosstalk occurring when the images are displayed on the display; and
a response speed improvement correction processor configured to improve a response speed of the display; wherein
the crosstalk correction processor being further configured to
perform an optical crosstalk correction process to correct optical crosstalk, and
perform an electrical crosstalk correction process to correct electrical crosstalk;
the crosstalk correction processor being configured to perform the optical crosstalk correction process on a basis of the input image data and outputs optical crosstalk correction processed image data;
the response speed improvement correction processor being configured to perform the improvement correction process on a basis of the optical crosstalk correction processed image data and outputs response speed improvement correction processed image data; and
the crosstalk correction processor being configured to perform the electrical crosstalk correction process on a basis of the response speed improvement correction processed image data and outputs electrical crosstalk correction processed image data as the corrected image data.

2. The image processing device of claim 1, wherein:
the crosstalk correction processor being configured to generate correction values used in the optical crosstalk correction process to correct optical crosstalk, and generate correction values used in the electrical crosstalk correction process to correct electrical crosstalk.

3. An image display device, comprising:
the image processing device of claim 2; and
a display for displaying the multiple images in the mutually differing directions, based on the corrected image data output by the image processing device.

4. An image display device, comprising:
the image processing device of claim 1; and
a display for displaying the multiple images in the mutually differing directions, based on the corrected image data output by the image processing device.

5. An image processing device for receiving image data in which multiple images that are displayed in mutually differing directions from a single display screen of a display are combined as input image data, and performing correction processes to output corrected image data,
the image processing device comprising:
a crosstalk correction processor configured to correct crosstalk occurring when the images are displayed on the display; and
a response speed improvement correction processor configured to perform a response speed improvement correction process to improve a response speed of the display; wherein
the crosstalk correction processor being further configured to
generate correction values for correcting optical crosstalk, and
generate correction values for correcting electrical crosstalk;
the response speed improvement correction processor performing the response speed improvement correction process on a basis of the input image data and outputs response speed improvement correction processed image data;
the crosstalk correction processor being further configured to generate the correction values for correcting optical crosstalk on a basis of the input image data and generate the correction values for correcting electrical crosstalk on a basis of the response speed improvement correction processed image data; and
the crosstalk correction processor being further configured to generate the corrected image data by using the correction values for correcting optical crosstalk and the correction values for correcting electrical crosstalk to perform an optical crosstalk correction process and an electrical crosstalk correction process on the response speed improvement correction processed image data.

6. An image display device, comprising:
the image processing device of claim 5; and
a display for displaying the multiple images in the mutually differing directions, based on the corrected image data output by the image processing device.

7. An image processing method for receiving image data in which multiple images that are displayed in mutually differing directions from a single display screen of a display are combined as input image data, and performing correction processes to output corrected image data,
the image processing method including:
performing a crosstalk correction process to correct crosstalk occurring when the images are displayed on the display; and
performing a response speed improvement correction process to improve a response speed of the display;
wherein said performing the crosstalk correction process includes,
performing an optical crosstalk correction process to correct optical crosstalk based on the input image data and outputting optical crosstalk correction processed image data, and
performing an electrical crosstalk correction process to correct electrical crosstalk;
wherein said performing the response speed improvement correction process is based on the optical crosstalk correction processed image data and outputs response speed improvement correction processed image data; and
wherein said performing electrical crosstalk correction process is based on the response speed improvement correction processed image data and outputs electrical crosstalk correction processed image data as the corrected image data.

8. An image processing method for receiving image data in which multiple images that are displayed in mutually differing directions from a single display screen of a display are combined as input image data, and performing correction processes to output corrected image data, the image processing method including:

performing a crosstalk correction process to correct crosstalk occurring when the images are displayed on the display; and performing a response speed improvement correction process to improve a response speed of the display;

wherein said performing the crosstalk correction process includes, performing optical crosstalk correction value generation for generating correction values for correcting optical crosstalk based on the input image data, and performing electrical crosstalk correction value generation for generating correction values for correcting electrical crosstalk;

wherein said performing the response speed improvement correction process is based on the input image data and outputs response speed improvement correction processed image data;

wherein said performing electrical crosstalk correction value generation generates the correction values for correcting electrical crosstalk on a basis of the response speed improvement correction processed image data; and wherein said performing the crosstalk correction process generates the corrected image data by using the correction values for correcting optical crosstalk and the correction values for correcting electrical crosstalk to perform an optical crosstalk correction process and an electrical crosstalk correction process on the response speed improvement correction processed image data.

9. A non-transitory computer-readable storage medium storing an image processing program for receiving image data in which multiple images that are displayed in mutually differing directions from a single display screen of a display are combined as input image data, and performing correction processes to output corrected image data, the image processing program causing a computer to execute:

performing a crosstalk correction process to correct crosstalk occurring when the images are displayed on the display; and performing a response speed improvement correction process to improve a response speed of the display;

wherein said performing the crosstalk correction process includes, performing an optical crosstalk correction process to correct optical crosstalk based on the input image data and outputting optical crosstalk correction processed image data, and performing an electrical crosstalk correction process to correct electrical crosstalk;

wherein said performing the response speed improvement correction process is based on the optical crosstalk correction processed image data and outputs response speed improvement correction processed image data; and wherein said performing electrical crosstalk correction process is based on the response speed improvement correction processed image data and outputs electrical crosstalk correction processed image data as the corrected image data.

10. A non-transitory computer-readable storage medium storing an image processing program for receiving image data in which multiple images that are displayed in mutually differing directions from a single display screen of a display are combined as input image data, and performing correction processes to output corrected image data, the image processing program causing a computer to execute:

performing a crosstalk correction process to correct crosstalk occurring when the images are displayed on the display; and performing a response speed improvement correction process to improve a response speed of the display;

wherein said performing the crosstalk correction process includes, performing optical crosstalk correction value generation for generating correction values for correcting optical crosstalk based on the input image data, and performing electrical crosstalk correction value generation for generating correction values for correcting electrical crosstalk;

wherein said performing the response speed improvement correction process is based on the input image data and outputs response speed improvement correction processed image data;

wherein said performing electrical crosstalk correction value generation generates the correction values for correcting electrical crosstalk on a basis of the response speed improvement correction processed image data; and wherein said performing the crosstalk correction process generates the corrected image data by using the correction values for correcting optical crosstalk and the correction values for correcting electrical crosstalk to perform an optical crosstalk correction process and an electrical crosstalk correction process on the response speed improvement correction processed image data.

* * * * *